US008162734B2

(12) United States Patent
Shinoda

(10) Patent No.: US 8,162,734 B2

(45) Date of Patent: Apr. 24, 2012

(54) CARD GAMING MACHINE

(75) Inventor: Tomohiro Shinoda, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 665 days.

(21) Appl. No.: 11/213,910

(22) Filed: Aug. 30, 2005

(65) Prior Publication Data

US 2006/0046815 A1 Mar. 2, 2006

(30) Foreign Application Priority Data

Aug. 31, 2004 (JP) ................................ P2004-251407

(51) Int. Cl.
*A63F 9/00* (2006.01)
*A63F 13/00* (2006.01)

(52) U.S. Cl. ................ 463/11; 463/12; 463/13; 463/30; 273/148 R; 273/149 R; 273/149 P

(58) Field of Classification Search .............. 463/11-13, 463/30-31; 273/148 R, 149 R, 149 P
See application file for complete search history.

(56) References Cited

U.S. PATENT DOCUMENTS 5,033,744 A * 7/1991 Bridgeman et al. ............ 463/13
5,221,083 A * 6/1993 Dote ................................ 463/32
5,224,706 A * 7/1993 Bridgeman et al. ............ 463/13
5,401,023 A * 3/1995 Wood .............................. 463/13
5,646,866 A * 7/1997 Coelho et al. ................. 715/716
5,688,174 A * 11/1997 Kennedy ......................... 463/37
5,732,950 A * 3/1998 Moody .......................... 273/292
5,823,873 A * 10/1998 Moody ........................... 463/13
6,007,066 A 12/1999 Moody
6,062,979 A * 5/2000 Inoue .............................. 463/12
6,248,016 B1 6/2001 Walker et al.
6,332,839 B2 12/2001 Walker et al.
6,494,454 B2 * 12/2002 Adams .......................... 273/292
6,607,443 B1 * 8/2003 Miyamoto et al. .............. 463/40
6,666,765 B2 * 12/2003 Vancura ............................ 463/9
6,719,629 B2 * 4/2004 Yang ............................... 463/13
6,755,741 B1 * 6/2004 Rafaeli ........................... 463/25
6,918,832 B2 * 7/2005 Baerlocher et al. ............. 463/20
7,128,651 B2 * 10/2006 Miyamoto et al. .............. 463/35
(Continued)

FOREIGN PATENT DOCUMENTS

JP 2001-70642 3/2001
(Continued)

OTHER PUBLICATIONS

"How to Play Slots," accessed Mar. 11, 2009, <http://www.laughlin-nevadaguide.com/slots.htm>.*

(Continued)

*Primary Examiner* — David L Lewis
*Assistant Examiner* — William H McCulloch, Jr.
(74) *Attorney, Agent, or Firm* — McGinn Intellectual Property Law Group, PLLC

(57) ABSTRACT

A card gaming machine including: an extraction unit for extracting at least a card from among a plurality of the cards with a predetermined kinds of symbols drawn thereon; a display unit for displaying an image of the cards extracted by the extraction unit and dealt to a player as the cards in player's hand; and a control unit for producing image effect on the display unit in response to the deal situation of the cards in player's hand displayed as an image by the display unit.

12 Claims, 33 Drawing Sheets

U.S. PATENT DOCUMENTS

| | | | | |
|---|---|---|---|---|
| 7,217,187 | B2 * | 5/2007 | Vancura | 463/9 |
| 7,223,171 | B2 * | 5/2007 | Colin et al. | 463/11 |
| 7,255,351 | B2 * | 8/2007 | Yoseloff et al. | 273/274 |
| 7,288,024 | B2 * | 10/2007 | Toyoda | 463/13 |
| 7,306,521 | B2 * | 12/2007 | Toyoda | 463/20 |
| 7,309,065 | B2 * | 12/2007 | Yoseloff et al. | 273/292 |
| 7,309,280 | B2 * | 12/2007 | Toyoda | 463/16 |
| 7,322,883 | B2 * | 1/2008 | Toyoda | 463/11 |
| 7,329,180 | B2 * | 2/2008 | Strom | 463/20 |
| 7,344,136 | B2 * | 3/2008 | Schultz | 273/292 |
| 7,344,440 | B2 * | 3/2008 | Gonen et al. | 463/13 |
| 7,355,112 | B2 * | 4/2008 | Laakso | 84/615 |
| 7,367,563 | B2 * | 5/2008 | Yoseloff et al. | 273/292 |
| 8,016,674 | B2 * | 9/2011 | Lucchesi et al. | 463/35 |
| 2001/0016512 | A1 * | 8/2001 | Walker et al. | 463/13 |
| 2002/0034976 | A1 * | 3/2002 | Webb | 463/22 |
| 2003/0064768 | A1 * | 4/2003 | Fier | 463/13 |
| 2003/0100357 | A1 * | 5/2003 | Walker et al. | 463/16 |
| 2003/0119579 | A1 * | 6/2003 | Walker et al. | 463/20 |
| 2003/0137109 | A1 * | 7/2003 | Vancura | 273/292 |
| 2003/0157978 | A1 * | 8/2003 | Englman | 463/16 |
| 2003/0176211 | A1 * | 9/2003 | Sommerville | 463/16 |
| 2003/0199316 | A1 * | 10/2003 | Miyamoto et al. | 463/35 |
| 2003/0214097 | A1 | 11/2003 | Moody | |
| 2004/0002380 | A1 * | 1/2004 | Brosnan et al. | 463/32 |
| 2004/0058725 | A1 | 3/2004 | Mayeroff | |
| 2004/0063482 | A1 * | 4/2004 | Toyoda | 463/11 |
| 2004/0072602 | A1 * | 4/2004 | Toyoda | 463/10 |
| 2004/0072608 | A1 * | 4/2004 | Toyoda | 463/17 |
| 2004/0087355 | A1 * | 5/2004 | Toyoda | 463/16 |
| 2004/0092312 | A1 * | 5/2004 | Toyoda | 463/42 |
| 2004/0119236 | A1 | 6/2004 | Moody | |
| 2004/0198485 | A1 * | 10/2004 | Loose et al. | 463/20 |
| 2004/0224777 | A1 * | 11/2004 | Smith et al. | 463/47 |
| 2004/0242298 | A1 * | 12/2004 | Inamura et al. | 463/13 |
| 2005/0073102 | A1 * | 4/2005 | Yoseloff et al. | 273/292 |
| 2005/0090303 | A1 * | 4/2005 | Dillhoff | 463/13 |
| 2006/0046815 | A1 * | 3/2006 | Shinoda | 463/13 |
| 2006/0073881 | A1 * | 4/2006 | Pryzby et al. | 463/20 |
| 2008/0076541 | A1 * | 3/2008 | Yoshizawa et al. | 463/26 |
| 2008/0085750 | A1 * | 4/2008 | Yoshizawa | 463/13 |
| 2008/0167103 | A1 * | 7/2008 | Okada | 463/11 |

FOREIGN PATENT DOCUMENTS

| | | |
|---|---|---|
| JP | 2001-070642 | 3/2001 |
| JP | 2004-195003 | 7/2004 |
| RU | 2227754 C1 | 4/2004 |
| WO | WO 03/083794 | 10/2003 |

OTHER PUBLICATIONS

"Odyssey Game Information," accessed Mar. 12, 2009, <http://www.robertwinter.com/slot/odyssey/games_pb.html>.*
Chinese Office Action dated Jun. 27, 2008 with English Translation.
European Search Report dated Nov. 30, 2005.
Macau Search Report dated Oct. 20, 2006, with English translation.
Filipino Office Action dated Sep. 1, 2011, in the English language.
Eurasian Search Report dated Feb. 26, 2006.
Australian Office Action dated May 30, 2011.

* cited by examiner

*FIG. 23*

| NO. | POKER PRIZE | AWARD | MAXIMUM AWARD |
|---|---|---|---|
| 1 | ROYAL FLUSH | 1000 | 40000 |
| 2 | SIX OF A KIND | 500 | 20000 |
| 3 | STRAIGHT FLUSH | 200 | 8000 |
| 4 | FIVE OF A KIND | 100 | 4000 |
| 5 | FULL HAND | 50 | 2000 |
| 6 | DOUBLE THREE OF A KIND | 25 | 1000 |
| 7 | FLUSH | 20 | 800 |
| 8 | FOUR OF A KIND | 10 | 400 |
| 9 | STRAIGHT | 5 | 200 |
| 10 | FULL HOUSE | 4 | 160 |
| 11 | THREE PAIRS | 3 | 120 |
| 12 | THREE OF A KIND | 2 | 80 |
| 13 | TWO PAIRS | 1 | 40 |

*FIG. 31*

| WINNING COMBINATION | DEALING EFFECT DESCRIPTION | COUNTER VALUE | (PROBABILITY) |
|---|---|---|---|
| NO. 1-4 | NONE | 0 | (1/10) |
| | PREMIUM EFFECT | 1-9 | (9/10) |
| NO. 5-7 | NONE | 0-1 | (2/10) |
| | FLASH + " ! " | 2-3 | (2/10) |
| | FLASH + " ! ! " | 4-5 | (2/10) |
| | FLASH + "☆" | 6-7 | (2/10) |
| | FLASH + "☆☆" | 8-9 | (2/10) |
| NO. 8-10 | NONE | 0-3 | (4/10) |
| | FLASH + " ! " | 4-5 | (2/10) |
| | FLASH + " ! ! " | 6-7 | (2/10) |
| | FLASH + "☆" | 8-9 | (2/10) |
| NO. 11-13 | NONE | 0-5 | (6/10) |
| | FLASH + " ! " | 6-7 | (2/10) |
| | FLASH + " ! ! " | 8-9 | (2/10) |
| BLANK | NONE | 0-8 | (9/10) |
| | FLASH + " ! " | 9 | (1/10) |

FIG. 32

| WINNING COMBINATION | DEALING EFFECT DESCRIPTION | COUNTER VALUE | (PROBABILITY) |
|---|---|---|---|
| NO. 1-4 | NONE | 0 | (1/10) |
| | PREMIUM EFFECT | 1-9 | (9/10) |
| NO. 5-7 | NONE | 0-1 | (2/10) |
| | FLASH + NONE | 2-3 | (2/10) |
| | FLASH + SMOKE | 4-5 | (2/10) |
| | FLASH + FLAME | 6-7 | (2/10) |
| | FLASH + THUNDER | 8-9 | (2/10) |
| NO. 8-10 | NONE | 0-3 | (4/10) |
| | FLASH + NONE | 4-5 | (2/10) |
| | FLASH + SMOKE | 6-7 | (2/10) |
| | FLASH + FLAME | 8-9 | (2/10) |
| NO. 11-13 | NONE | 0-5 | (6/10) |
| | FLASH + NONE | 6-7 | (2/10) |
| | FLASH + SMOKE | 8-9 | (2/10) |
| BLANK | NONE | 0-8 | (9/10) |
| | FLASH + NONE | 9 | (1/10) |

FIG. 33

| NUMBER OF WIN CARDS | DEALING EFFECT DESCRIPTION | COUNTER VALUE (PROBABILITY) | |
|---|---|---|---|
| FIVE | NONE | 0-1 | (2/10) |
| | FLASH + NONE | 2-3 | (2/10) |
| | FLASH + GIDDINESS | 4-5 | (2/10) |
| | RANDOM FLASH + NONE | 6-7 | (2/10) |
| | HEAVY FLASH + FAINTING | 8-9 | (2/10) |
| FOUR OR THREE | NONE | 0-3 | (4/10) |
| | FLASH + NONE | 4-6 | (3/10) |
| | FLASH + GIDDINESS | 7-9 | (3/10) |
| TWO OR ONE | NONE | 0-5 | (6/10) |
| | FLASH | 6-9 | (4/10) |
| ZERO | NONE | 0-9 | (10/10) |

CARD GAMING MACHINE

CROSS-REFERENCE TO THE RELATED APPLICATION(S)

This application is based upon and claims a priority from prior Japanese Patent Applications No. 2004-251407 filed on Aug. 31, 2004, the entire contents of which are incorporated herein by reference.

BACKGROUND OF THE INVENTION

1. Field of the Invention

This invention relates to a card gaming machine.

2. Description of the Related Art

A video poker gaming machine for displaying cards on a display, thereby dealing the cards to a player for allowing the player to play a game is known as one kind of card gaming machine of amusement. In the video poker, for example, the player can exchange one card for another by performing selection operation after five cards are dealt. Here, if the player selects a card to be held without exchange, the remaining cards not held are turned outside out, and a new card after exchange is displayed as the player presses a button. (For example, refer to JP-A-2001-70642.) The game result is determined in response to the prize effected according to the combination of the held cards and the new card after exchange. Thus, the poker gaming machine allows the player to expect that the card combination will result in a high prize and enjoy playing the game when the new card after exchange is displayed.

However, special effect of image display or sound is not produced from the player determining the bet count to displaying the first dealt card and at the point in time, if a big prize such as royal flush or four of a kind is complete or if no prize is complete, the game proceeds in a similar manner. For example, if the player determines the bet count and then presses a button, five cards dealt in the beginning are displayed with the inside out at the same time or one at a time from left to right, whereby the cards dealt to the player are displayed; the cards are displayed according to a given pattern regardless of what the prize completed at the point in time is. Thus, the game easily becomes monotonous.

SUMMARY OF THE INVENTION

It is therefore an object of the invention to provide a card gaming machine that can prevent a game from becoming monotonous and amplify the player's sense of anticipation.

To the end, according to the first aspect of the invention, there is provided a card gaming machine including an extraction unit for extracting at least a card from among a plurality of the cards with a predetermined kinds of symbols drawn thereon; a display unit for displaying an image of the cards extracted by the extraction unit and dealt to a player as the cards in player's hand; and a control unit for producing image effect on the display unit in response to the deal situation of the cards in player's hand displayed as an image by the display unit.

As the "image effect," for example, the display mode of the cards dealt to the player may be changed or if a dealer for dealing cards is displayed, the display mode of the dealer may be changed.

In a second aspect of the invention according to the first aspect of the invention, the card gaming machine further includes a storage unit for storing a plurality of card combinations; and a determination unit for determining whether or not the combination of the symbols drawn on the cards extracted by the extraction unit matches a specific one of the card combinations stored in the storage unit, wherein if the determination unit determines that the combination of the symbols drawn on the cards extracted by the extraction unit matches a specific one of the card combinations stored in the storage unit, the control unit executes the operation.

In a third aspect of the invention according to the first and the second aspect of the invention, the card gaming machine, a video poker is played.

The term "specific combination" refers to a prize or a card combination such as royal flush or four of a kind, for example, in video poker, or the prize or the card combination having a given award rate or more. The term "award rate" is the rate of the number of game medals acquired by the player to the number of game medals bet by the player.

In the card gaming machine of the invention, when some of cards are extracted from among the cards and the extracted cards are dealt to the player and are displayed as the cards in player's hand, the image effect is produced in response to the deal situation of the cards in player's hand displayed as an image. Therefore, it is made possible for the player to recognize the deal situation of the cards in player's hand displayed as the image according to the image effect. Thus, the player's sense of anticipation can be amplified for the game which tends to become monotonous.

BRIEF DESCRIPTION OF THE DRAWINGS

These and other objects and advantages of the present invention will be more fully apparent from the following detailed description taken in conjunction with the accompanying drawings, in which:

FIG. 23 is a table listing the numbers and awards provided in a one-to-one correspondence with poker prizes;

FIG. 31 is a drawing to show an outline of a dealing effect table of the poker gaming machine according to the embodiment of the invention;

FIG. 32 is a drawing to show an outline of a draw dealing effect table of the poker gaming machine according to the embodiment of the invention; and FIG. 33 is a drawing to show an outline of a double down game dealing effect table of the poker gaming machine according to the embodiment of the invention.

DETAILED DESCRIPTION OF THE PREFERRED EMBODIMENTS

Figure 1:
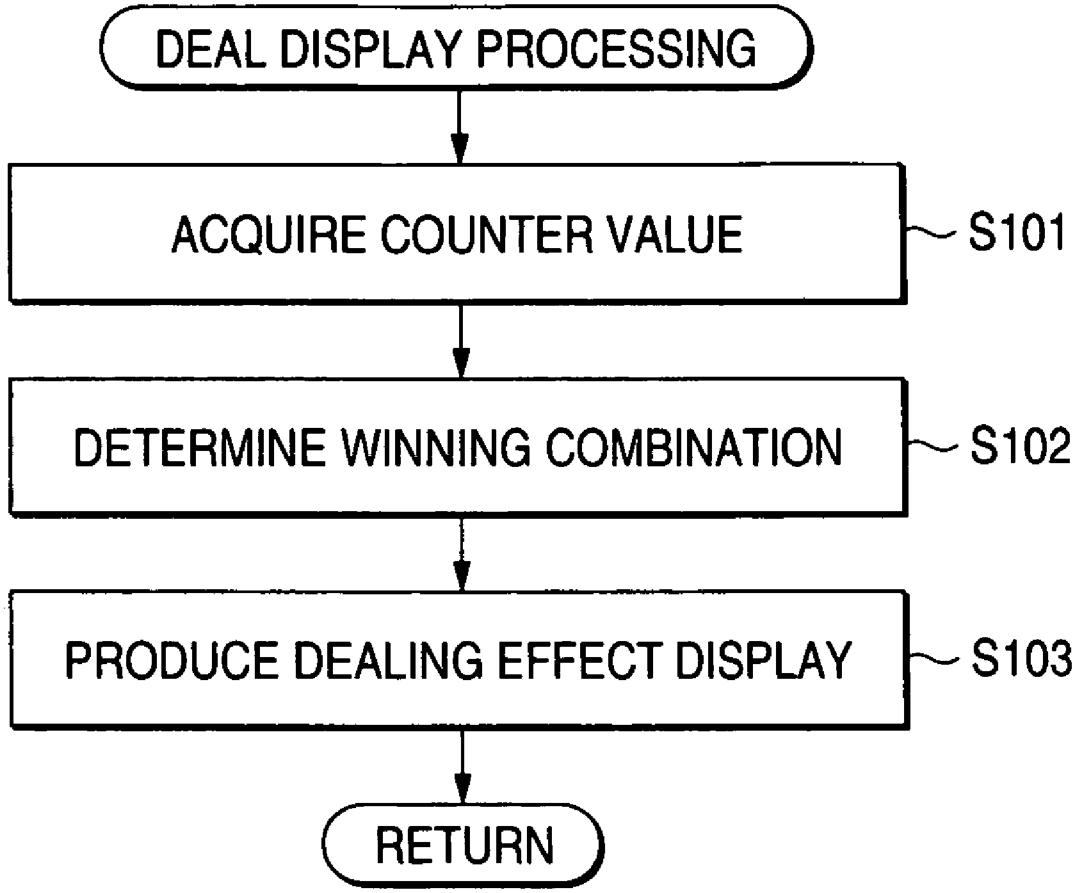
FIG. 1 is a flowchart to show the game control operation of a game control apparatus in a poker gaming machine according to one embodiment of the invention.

Referring now to the accompanying drawings, there is shown a preferred embodiment of the invention. In the embodiment of the invention, a poker gaming machine is adopted as one form of card gaming machine. Then, a poker game played with the poker gaming machine of the embodiment will be discussed briefly. The poker gaming machine of the embodiment allows the player to play a six-card video poker using two decks of cards; it allows the player to play a draw poker wherein all or some of the cards of the player can be exchanged for new cards at one point in time of the poker game. Specifically, here, when a game medal, etc., is inserted, six cards are dealt and displayed. Then, the player holds the card determined necessary from among the six dealt cards to complete a poker prize (poker card combination) (royal flush, six of a kind, straight flush, five of a kind, full hand, double three of a kind, flush, four of a kind, straight, full house, three pairs, three of a kind, two pairs, etc.,); on the other hand, the player exchanges the card determined unnecessary for a new card. Consequently, if a prize comes into effect, as many game medals, etc., as the number of game medals, etc., corresponding to the prize are given to the player as an award.

Further, if a poker prize comes into effect, the poker gaming machine of the embodiment enables the player to play a double down game if the player wants to play it. Specifically, the double down game is as follows: When one card is dealt to the dealer and is displayed as a face-up card and five cards are dealt to the player and are displayed as face-down cards, then the player selects one card from among the five face-down cards and exposes the selected card. At this time, if the card selected and exposed by the player is greater than the card of the dealer, the award becomes double as a bonus; if the card selected and exposed by the player is equal to or smaller than the card of the dealer, the award is confiscated. Here, the greater-than and smaller-than relation of the cards is as follows: A (Ace corresponding to 1), K (King corresponding to 13), Q (Queen corresponding to 12), J (Jack corresponding to 11), 10, 9, 8, 7, 6, 5, 4, 3, 2 in the descending order.

When a video poker is played, if a prize comes into effect in the six cards of the player just after six cards are dealt and are displayed or just after the card determined unnecessary is exchanged for a new card, the poker gaming machine of the embodiment often changes the display mode of the cards of the player in such a manner that it instantaneously flashes the dealt or exchanged cards of the player, and may change the display mode of the dealer in such a manner that it provides a balloon for the dealer dealing or exchanging cards.

When a double down game is played, the poker gaming machine of the embodiment often changes the display mode of the cards of the player in such a manner that it flashes the face-down card of the player greater than the card of the dealer just after five cards are dealt to the player and are displayed as face-down cards.

Figure 2:
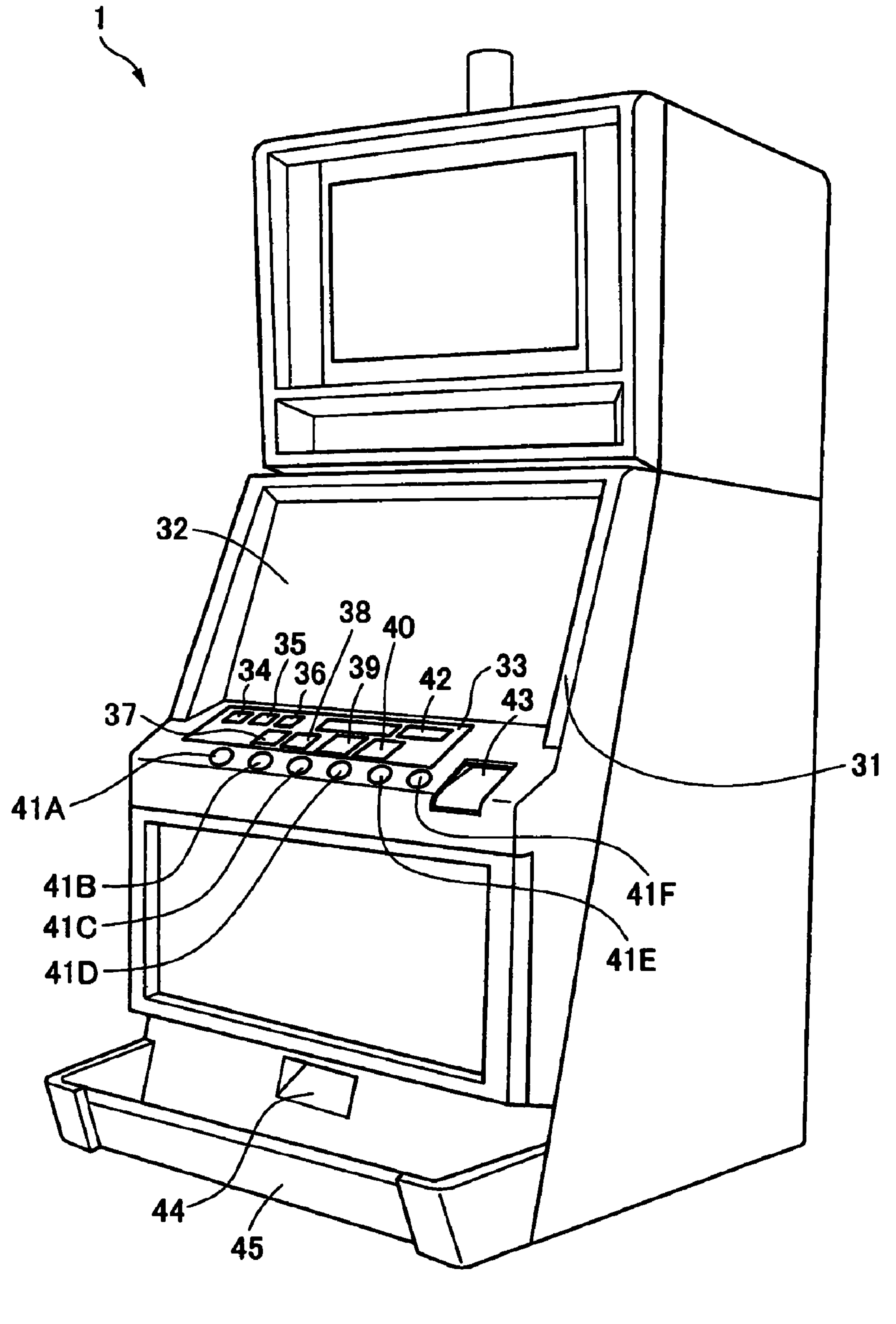
FIG. 2 is a perspective view of the poker gaming machine according to the embodiment of the invention.
Figure 3:
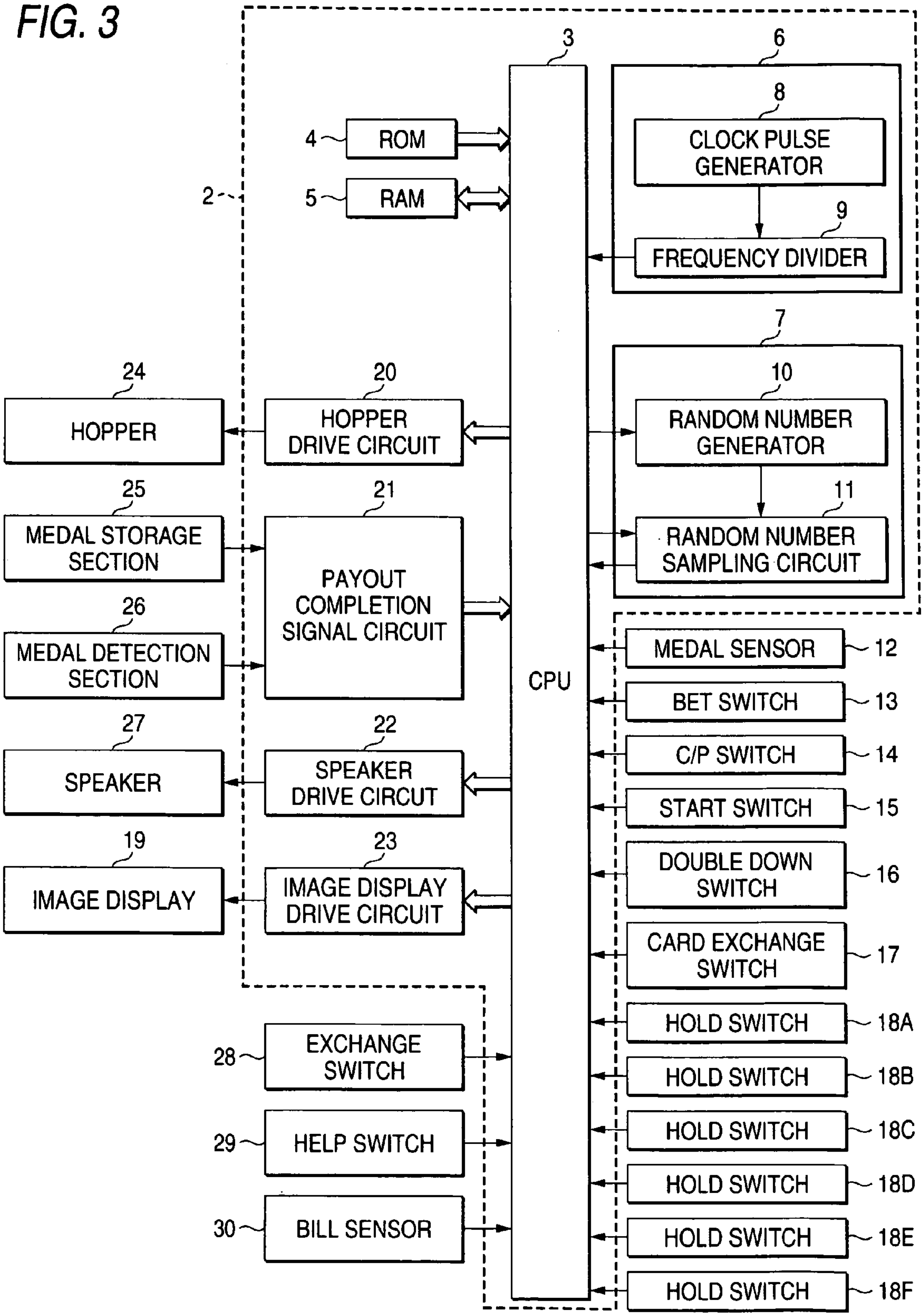
FIG. 3 is a block diagram to show the schematic configuration of the poker gaming machine according to the embodiment of the invention.

Next, the schematic configuration of the poker gaming machine of the embodiment will be discussed based on FIGS. 2 and 3. FIG. 2 is a perspective view of the poker gaming machine of the embodiment. FIG. 3 is a block diagram to show the schematic configuration of the poker gaming machine of the embodiment.

A poker gaming machine 1 of the embodiment has a cabinet 31 forming the whole of the gaming machine and has a display screen 32 disposed in the front center of the cabinet 31, as shown in FIG. 2.

The display screen 32 is a display section of an image display 19 (see FIG. 3).

A medal payout opening 44 and a medal receiving tray 45 are disposed at the bottom of the cabinet 31. The medal payout opening 44 communicates with a hopper 24 incorporated in the poker gaming machine 1 of the embodiment (see FIG. 3). Therefore, a game medal, etc., from the hopper 24 (see FIG. 3) is paid out through the medal payout opening 44 to the medal receiving tray 45. A medal detection section 26 made up of a sensor, etc., (see FIG. 3) is disposed inside the medal payout opening 44. Therefore, the number of game medals, etc., paid out through the medal payout opening 44 to the medal receiving tray 45 is detected by the medal detection section 26 (see FIG. 3).

An operation table 33 projecting to the front is provided below the display screen 32. An exchange button 34, a C/P (credit/payout) button 35, and a help button 36 are disposed from left to right at the upper stage of the operation table 33. A BET button 37, a start button 38, a double down button 39, and a card exchange button 40 are disposed from left to right at the intermediate stage of the operation table 33. Six hold buttons 41A, 41B, 41C, 41D, 41E, and 41F are disposed at the rear stage of the operation table 33. Further, a medal insertion section 42 and a bill insertion section 43 are disposed to the right of the help button 36.

The exchange button 34 is a button operated by the player to exchange the bill inserted into the bill insertion section 43 into game medals, etc. Therefore, when the player presses the exchange button 34, the game medals, etc., into which the bill is exchanged are paid out from the hopper 24 (see FIG. 3) through the medal payout opening 44 to the medal receiving tray 45.

The exchange button 34 contains an exchange switch 28 (see FIG. 3) and when the player presses the exchange button 34, a switch signal from the exchange switch 28 (see FIG. 3) is output to a CPU 3 (see FIG. 3).

The C/P button 35 is a button pressed by the player to pay out the game medals, etc., given as credit or an award. Therefore, if the player presses the C/P button 35, the game medals, etc., given as credit or an award are paid out from the hopper 24 (see FIG. 3) through the medal payout opening 44 to the medal receiving tray 45.

If the player does not press the C/P button 35, the game medals, etc., given as an award are automatically carried over as credit.

The C/P button 35 contains a C/P switch 14 (see FIG. 3) and when the player presses the C/P button 35, a switch signal from the C/P switch 14 (see FIG. 3) is output to the CPU 3 (see FIG. 3).

The help button 36 is a button pressed by the player if the player does not know the poker game operation method, etc. Therefore, if the player presses the help button 36, various pieces of help information are displayed on the display screen 32.

The help button 36 contains a help switch 29 (see FIG. 3) and when the player presses the help button 36, a switch signal from the help switch 29 (see FIG. 3) is output to the CPU 3 (see FIG. 3).

The BET button 37 is a button operated by the player to bet credited game medals, etc. Here, whenever the player presses the BET button 37, the bet count is incremented by one. If the player presses the BET button 37 once after the bet count reaches 40, the bet count returns to 1. Therefore, here the maximum bet count is 40.

The BET button 37 contains a BET switch 13 (see FIG. 3) and when the player presses the BET button 37, a switch signal from the BET switch 13 (see FIG. 3) is output to the CPU 3 (see FIG. 3).

The start button 38 is a button operated by the player to start a poker game. Therefore, if the player presses the start button 38, developing a poker game is started on the display screen 32.

The start button 38 contains a start switch 15 (see FIG. 3) and when the player presses the start button 38, a switch signal from the start switch 15 (see FIG. 3) is output to the CPU 3 (see FIG. 3).

The double down button 39 is a button operated by the player to start a double down game. Therefore, if the player presses the double down button 39, developing a double down game is started on the display screen 32.

The double down button 39 contains a double down switch 16 (see FIG. 3) and when the player presses the double down button 39, a switch signal from the double down switch 16 (see FIG. 3) is output to the CPU 3 (see FIG. 3).

The card exchange button 40 is a button operated by the player to exchange the card determined unnecessary among the six dealt cards for a new card in the poker game developed on the display screen 32. Therefore, if the player presses the card exchange button 40 at a predetermined timing described later, the card for which the card determined unnecessary is exchanged is displayed on the display screen 32 together with the held cards.

When held cards do not exist, all the six dealt cards are not to be exchanged and thus if the player presses the card exchange button 40 at a predetermined timing described later, all the six dealt cards remain displayed on the display screen 32.

The card exchange button 40 contains a card exchange switch 17 (see FIG. 3) and when the player presses the card exchange button 40, a switch signal from the card exchange switch 17 (see FIG. 3) is output to the CPU 3 (see FIG. 3).

The six hold buttons 41A, 41B, 41C, 41D, 41E, and 41F are buttons operated by the player to hold the card determined necessary among the six dealt cards in the poker game developed on the display screen 32. Therefore, if the player presses any of the six hold buttons, 41A, 41B, 41C, 41D, 41E, or 41F at a predetermined timing described later, the card corresponding to the pressed button of the six hold buttons 41A, 41B, 41C, 41D, 41E, and 41F is not to be exchanged later.

The hold buttons 41A, 41B, 41C, 41D, 41E, and 41F contain hold switches 18A, 18B, 18C, 18D, 18E, and 18F (see FIG. 3) respectively. Therefore, when the player presses the hold button 41A, a switch signal from the hold switch 18A contained in the hold button 41A (see FIG. 3) is output to the CPU 3 (see FIG. 3). When the player presses the hold button 41B, a switch signal from the hold switch 18B contained in the hold button 41B (see FIG. 3) is output to the CPU 3 (see FIG. 3). When the player presses the hold button 41C, a switch signal from the hold switch 18C contained in the hold button 41C (see FIG. 3) is output to the CPU 3 (see FIG. 3). When the player presses the hold button 41D, a switch signal from the hold switch 18D contained in the hold button 41D (see FIG. 3) is output to the CPU 3 (see FIG. 3). When the player presses the hold button 41E, a switch signal from the hold switch 18E contained in the hold button 41E (see FIG. 3) is output to the CPU 3 (see FIG. 3). When the player presses the hold button 41F, a switch signal from the hold switch 18F contained in the hold button 41F (see FIG. 3) is output to the CPU 3 (see FIG. 3).

The medal insertion section 42 is an insertion slot used by the player to feed a game medal, etc., into a poker game.

The game medals, etc., inserted into the medal insertion section 42 are automatically credited.

A medal sensor 12 (see FIG. 3) is disposed inside the medal insertion section 42 and when a game medal, etc., is inserted into the medal insertion section 42, a medal detection signal from the medal sensor 12 (see FIG. 3) is output to the CPU 3 (see FIG. 3).

The bill insertion section 43 is an insertion slot used by the user to exchange a bill into a game medal, etc.

The bill inserted into the bill insertion section 43 is exchanged into a game medal, etc., as the player presses the exchange button 34.

A bill sensor 30 (see FIG. 3) is disposed inside the bill insertion section 43 and when a bill is inserted into the bill insertion section 43, a bill detection signal from the bill sensor 30 (see FIG. 3) is output to the CPU 3 (see FIG. 3).

In the poker gaming machine 1 of the embodiment, a game control apparatus 2 controls a poker game, as shown in FIG. 3. The game control apparatus 2 is made up of the CPU 3, ROM 4, RAM 5, a clock circuit 6 for generating an operation clock signal of the CPU 3, a random number control section 7 for controlling random numbers used with a poker game, and the like.

The ROM 4 stores processing procedures in a poker game and a double down game as a sequence program. Further, it also stores data of a winning probability table for determining the lottery probability, etc., for controlling occurrence of a poker prize (poker card combination), a lottery table for associating the random number sampled by the random number control section 7 and the card to be displayed on the display screen 32 described later with each other, a determination table for determining whether or not the symbol combination state of the six cards displayed on the display screen 32 described later is a poker prize state, a game advance procedure table for determining the advance procedures of a poker game and a double down game, and the like. That is, the CPU 3, etc., operates based on the sequence program, the tables, etc., stored in the ROM 4, whereby the poker game and the double down game in the poker gaming machine 1 of the embodiment are controlled. Tables, etc., later described with reference to FIGS. 23 and 31 to 33 are also stored in the ROM 4.

A work area, etc., required for the CPU 3, etc., to operate for controlling the poker game is provided in the RAM 5.

The clock circuit 6 includes a clock pulse generator 8 for generating the reference clock of a predetermined frequency, a frequency divider 9 for dividing the reference clock signal to generate the operation clock signal of the CPU 3, and the like.

The random number control section 7 includes a random number generator 10 for generating random numbers in a given range under the control of the CPU 3, a random number sampling circuit 11 for extracting any desired random number from among the random numbers generated by the random number generator 10 and transmitting the extracted random number to the CPU 3, and the like.

Connected to a plurality of I/O ports included in the CPU 3 are the medal sensor 12, the BET switch 13, the C/P switch 14, the start switch 15, the double down switch 16, the card exchange switch 17, the six hold switches 18A, 18B, 18C, 18D, 18E, and 18F, the exchange switch 28, the help switch 29, the bill sensor 30, and the like. Also connected to the I/O ports are a hopper drive circuit 20, a payout completion signal circuit 21, a speaker drive circuit 22, an image display drive circuit 23, and the like.

A hopper 24 for storing game medals, etc., is connected to the hopper drive circuit 20. Therefore, the CPU 3 can pay out a predetermined number of game medals, etc., from the hopper 24 through the hopper drive circuit 20.

A medal storage section 25 and the medal detection section 26 are connected to the payout completion signal circuit 21. The medal storage section 25 is a circuit for storing the game medals, etc., inserted from the medal insertion section 42 and the game medals, etc., given as an award as credit, and can store the game medals, etc., as credit until the predetermined maximum allowable number (for example, 999999) is reached. On the other hand, the medal detection section 26 is a circuit for counting the number of game medals, etc., paid out from the hopper 24.

When the game medals, etc., are given as credit, if the payout completion signal circuit 21 detects completion of storing the game medals, etc., as credit or paying out the game medals, etc., from the hopper 24 through the medal storage section 25 or the medal detection section 26, the payout completion signal circuit 21 outputs a payout completion signal indicating the completion to the CPU 3. Further, when the game medals, etc., stored as credit are paid out, if the payout completion signal circuit 21 detects completion of paying out the game medals, etc., stored as credit from the hopper 24 through the medal storage section 25 or the medal detection section 26, the payout completion signal circuit 21 outputs a payout completion signal indicating the completion to the CPU 3.

A speaker 27 for producing an effect sound, etc., is connected to the speaker drive circuit 22. Therefore, the CPU 3 can produce the effect sound corresponding to the gaming state from the speaker 27 through the speaker drive circuit 22.

The image display 19 having the display screen 32 (see FIG. 2) as the display section is connected to the image display drive circuit 23. Therefore, the CPU 3 can cause the image display 19 to display an image of the game contents, etc., on the display screen 32 (see FIG. 2) (see FIGS. 4 to 22).

The display screen 32 (see FIG. 2), the display section of the image display 19, is a CRT display, a liquid crystal display, a plasma display, etc., for example.

Next, specific examples of the gaming procedures in the poker gaming machine 1 of the embodiment will be discussed based on FIGS. 4 to 22.

Figure 4:
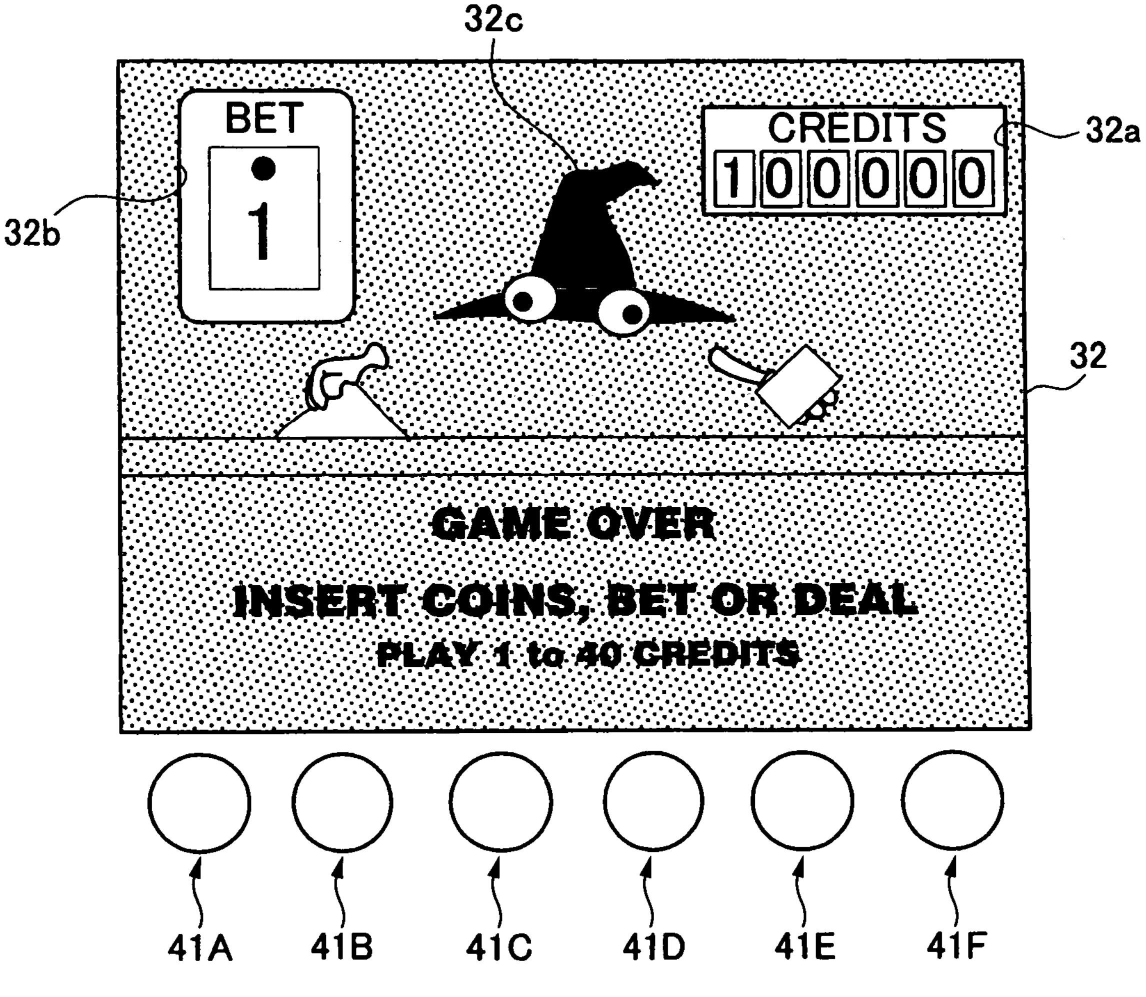
FIG. 4 is a drawing to show an example of a display screen in a standby state before a poker game is developed in the poker gaming machine according to the embodiment of the invention.
Figure 17:
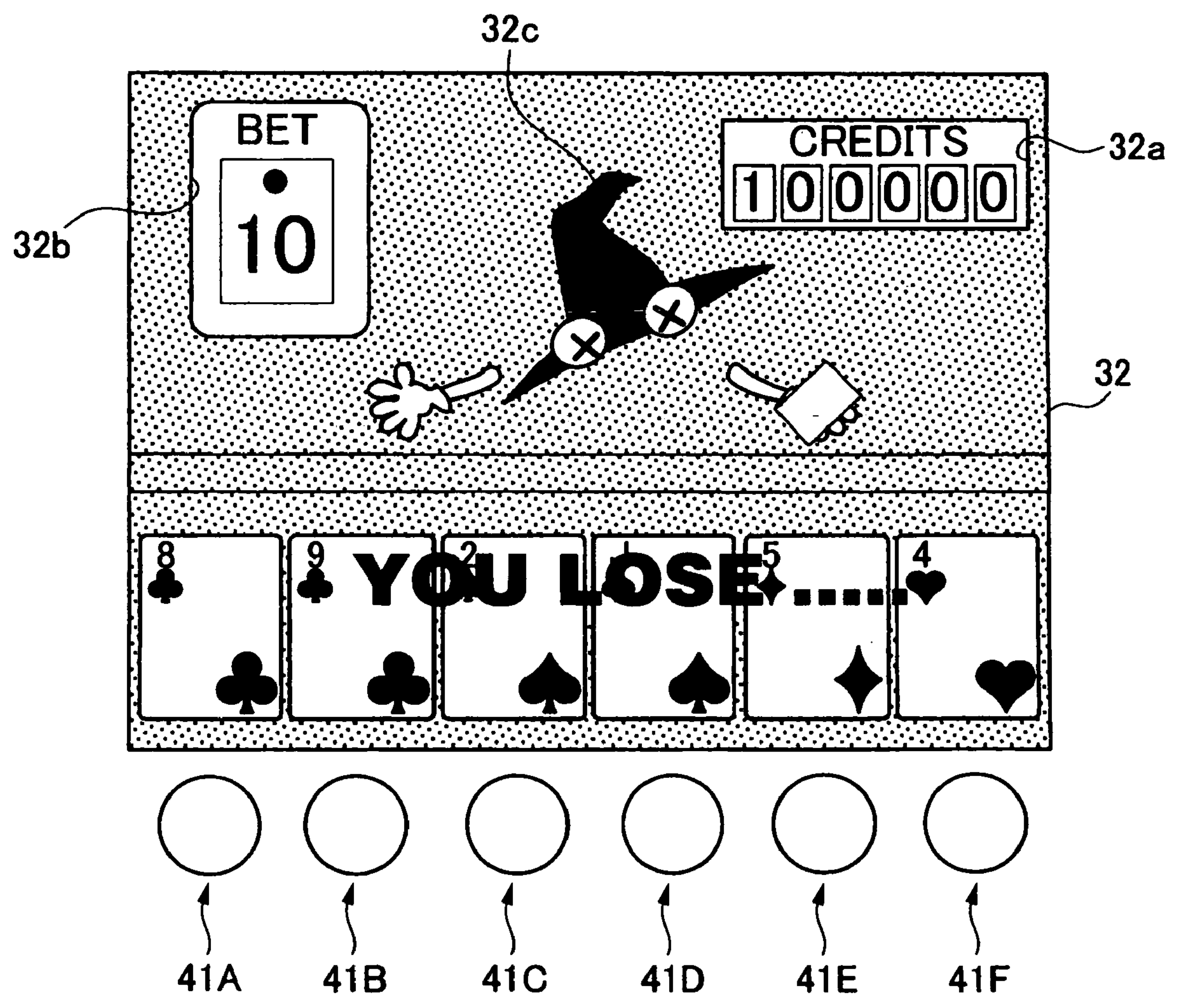
FIG. 17 is a drawing to show an example of the game contents displayed on the display screen when the poker game is developed in the poker gaming machine according to the embodiment of the invention.
Figure 18:
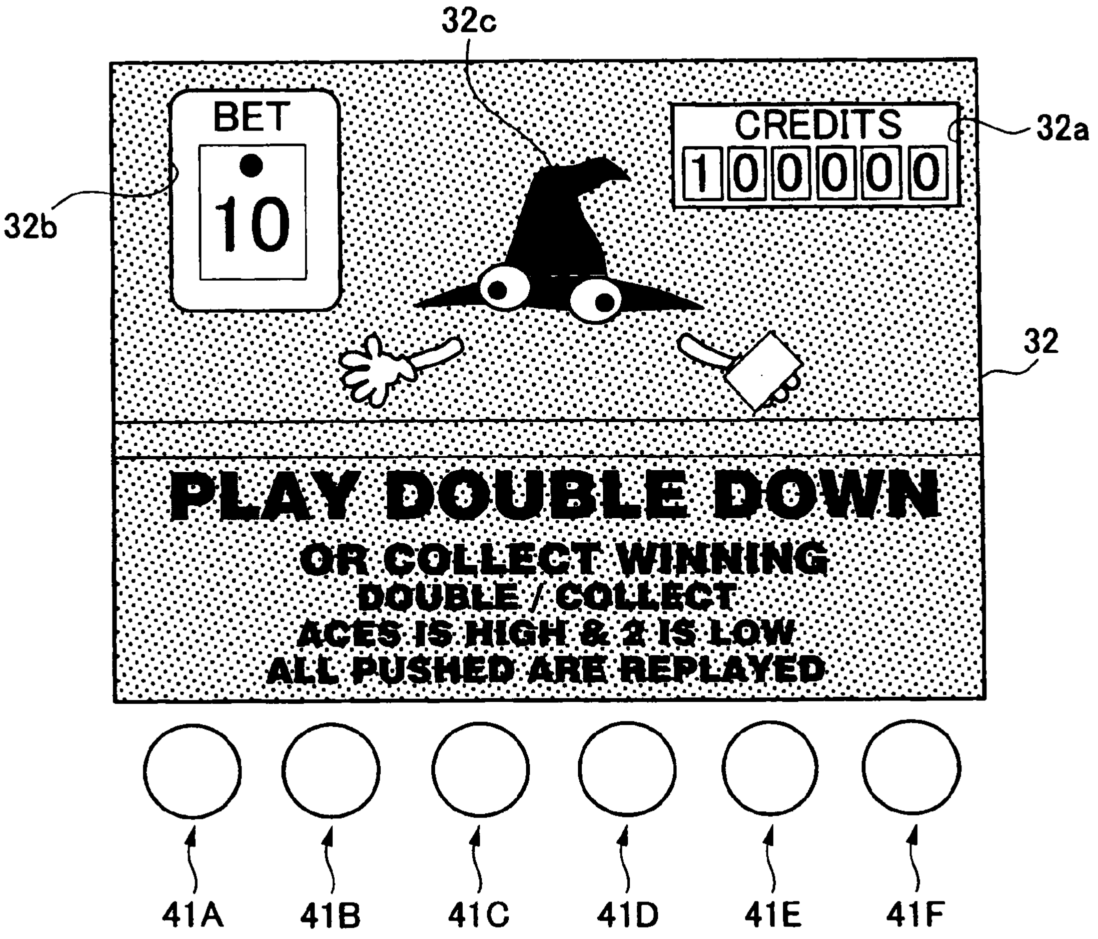
FIG. 18 is a drawing to show an example of the game contents displayed on the display screen before a double down game is developed in the poker gaming machine according to the embodiment of the invention.
Figure 19:
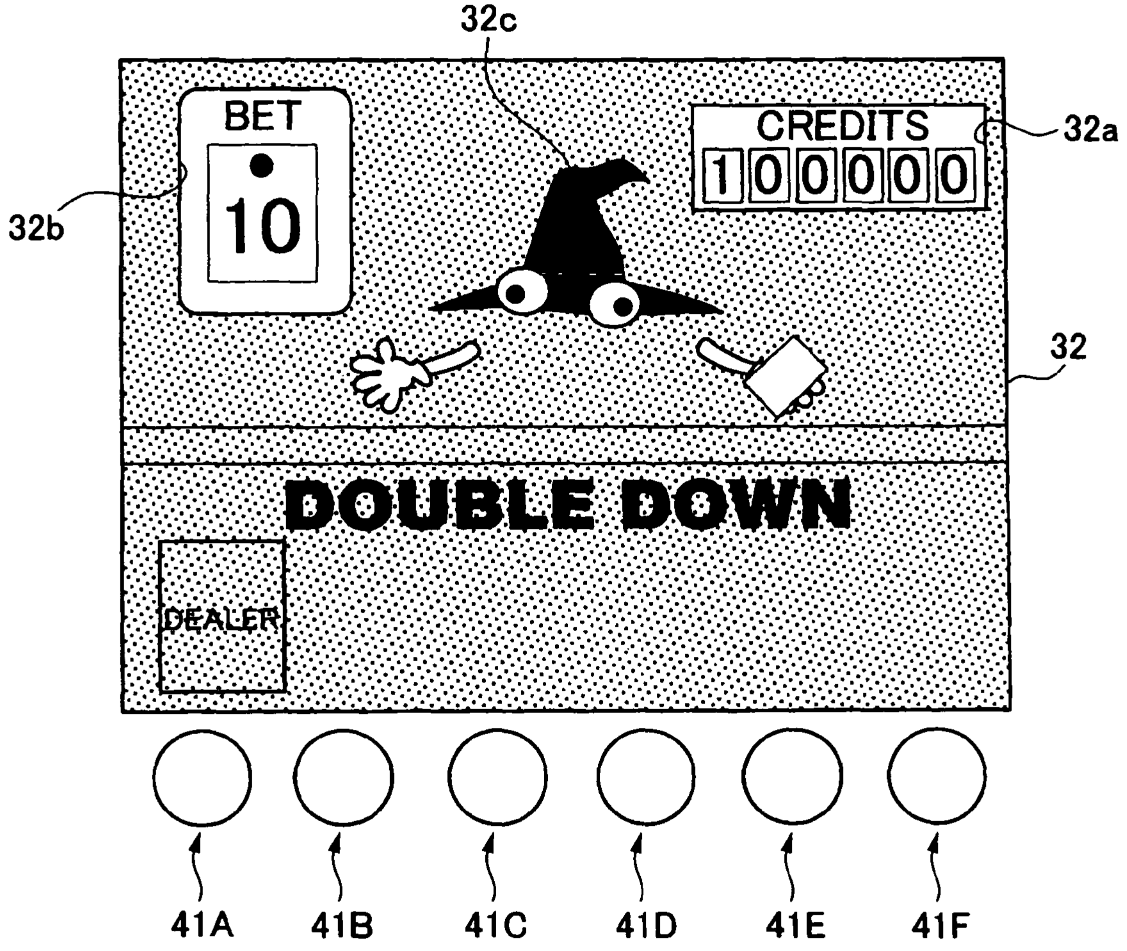
FIG. 19 is a drawing to show an example of the game contents displayed on the display screen when the double down game is developed in the poker gaming machine according to the embodiment of the invention.

FIG. 4 is a drawing to show an example of the display screen 32 in a standby state before a poker game is developed. FIGS. 5 to 16 are drawings to show an example of the game contents displayed on the display screen 32 when a poker game is developed. FIG. 17 is a drawing to show an example of the game contents displayed on the display screen 32 when a poker game or a double down game is developed. FIG. 18 is a drawing to show an example of the display screen 32 in a standby state before a double down game is developed. FIGS. 19 to 22 are drawings to show an example of the game contents displayed on the display screen 32 when a double down game is developed.

To begin with, the terms concerning the cards will be discussed. "Suit" is any of the four sets of 13 cards (hearts, diamonds, clubs, and spades), the members of which bear the same marks.

"Picture pattern" is the type of card determined by the combination of the suit and numeral of the card, for example, such as ace of heart or king of spade.

"Numeral" means the numeral of a card; A (Ace corresponding to 1), 2, 3, 4, 5, 6, 7, 8, 9, 10, J (Jack corresponding to 11), Q (Queen corresponding to 12), and K (King corresponding to 13) are included in one deck of cards.

Further, "symbol" contains "suit," "picture pattern," and "numeral."

In the poker gaming machine 1 of the embodiment, when the display screen 32 is a title screen in the standby state, if a game medal, etc., is inserted into the medal insertion section 42 or is given as an award, credit is entered in the medal storage section 25 and the credit count is displayed in a credit count display field 32*a* in the upper right corner of the display screen 32, as shown in FIG. 4. For example, if the credit count is "100000," the character string "100000" is displayed in the credit count display field 32*a* in the upper right corner of the display screen 32, as shown in FIG. 4. In this state, if the player presses the BET 37, the BET count in the storage area provided in the RAM 5 is incremented by one each time the player presses the BET 37. If the BET count is 1 or more, the player can play draw poker. Further, at this time, the current BET count is displayed in a bet count display field 32*b* in the upper left corner of the display screen 32. For example, if the BET count is 1, the character "1" is displayed in the bet count display field 32*b* in the upper left corner of the display screen 32, as shown in FIG. 4. If the BET count is 10, the character string "10" is displayed in the bet count display field 32*b* in the upper left corner of the display screen 32, as shown in FIGS. 5 to 22.

In the poker gaming machine 1 of the embodiment, while a poker game or a double down game is being developed, a character 32*c* of a dealer for dealing cards, which will be hereinafter referred to as "the dealer 32*c*," is displayed at the center of the display screen 32, as shown in FIGS. 4 to 22.

Poker prize (poker card combination) will be discussed. The "poker prize (poker card combination)" is a state in which some or all of six cards match based on a given rule in draw poker; specifically, it is two pairs, three of a kind, three pairs, full house, straight, four of a kind, flush, double three of a kind, full hand, five of a kind, straight flush, six of a kind, or royal flush (see FIG. 23). The two pairs refer to a state in which there are two pairs of cards matching in numeral. The three of a kind refers to a state in which there is one set of three cards matching in numeral. The three pairs refer to a state in which there are three pairs of cards matching in numeral. The full house refers to a state in which there are one pair of cards matching in numeral and one set of three cards matching in numeral. The straight refers to a state in which the six cards are serial numbers in the numeral order of A, 2, . . . , 10, J, Q, K, A regardless of the suits. The four of a kind refers to a state in which there is one set of four cards matching in numeral. The flush refers to a state in which all six cards match in suit. The double three of a kind refers to a state in which there are two sets of three cards matching in numeral. The full hand refers to a state in which there are one set of four cards matching in numeral and one pair of cards matching in numeral, such as 5, 5, 5, 5, 7, 7. The five of a kind refers to a state in which there is one set of five cards matching in numeral. The straight flush refers to a state of straight and flush. The six of a kind refers to a state in which there is one set of six cards matching in numeral. The royal flush refers to a state of straight and flush in which the numerals are 10, J, Q, K, A in this order.

The poker prizes are assigned numbers and awards, as shown in FIG. 23. FIG. 23 is a table listing the numbers and awards provided in a one-to-one correspondence with the poker prizes.

First, the numbers assigned to the poker prizes will be discussed.

As listed in the table of FIG. 23, "No. 13" is assigned to the poker prize of two pairs. "No. 12" is assigned to the poker prize of three of a kind. "No. 11" is assigned to the poker prize of three pairs. "No. 10" is assigned to the poker prize of full house. "No. 9" is assigned to the poker prize of straight. "No. 8" is assigned to the poker prize of four of a kind. "No. 7" is assigned to the poker prize of flush. "No. 6" is assigned to the poker prize of double three of a kind. "No. 5" is assigned to the poker prize of full hand. "No. 4" is assigned to the poker prize of five of a kind. "No. 3" is assigned to the poker prize of straight flush. "No. 2" is assigned to the poker prize of six of a kind. "No. 1" is assigned to the poker prize of royal flush.

Next, the awards assigned to the poker prizes will be discussed.

As listed in the table of FIG. 23, when the player confirms two pairs as the poker prize, one game medal, etc., per BET count "1" is given to the player. Therefore, if the maximum BET count "40" is applied, 40 game medals, etc., are given to the player as the maximum award. When the player confirms three of a kind as the poker prize, two game medals, etc., per BET count "1" are given to the player. Therefore, if the maximum BET count "40" is applied, 80 game medals, etc., are given to the player as the maximum award. When the player confirms three pairs as the poker prize, three game medals, etc., per BET count "1" are given to the player. Therefore, if the maximum BET count "40" is applied, 120 game medals, etc., are given to the player as the maximum award. When the player confirms full house as the poker prize, four game medals, etc., per BET count "1" are given to the player. Therefore, if the maximum BET count "40" is applied, 160 game medals, etc., are given to the player as the maximum award. When the player confirms straight as the poker prize, five game medals, etc., per BET count "1" are given to the player. Therefore, if the maximum BET count "40" is applied, 200 game medals, etc., are given to the player as the maximum award. When the player confirms four of a kind as the poker prize, 10 game medals, etc., per BET count "1" are given to the player. Therefore, if the maximum BET count "40" is applied, 400 game medals, etc., are given to the player as the maximum award.

When the player confirms flush as the poker prize, 20 game medals, etc., per BET count "1" are given to the player. Therefore, if the maximum BET count "40" is applied, 800 game medals, etc., are given to the player as the maximum award. When the player confirms double three of a kind as the poker prize, 25 game medals, etc., per BET count "1" are given to the player. Therefore, if the maximum BET count "40" is applied, 1000 game medals, etc., are given to the player as the maximum award. When the player confirms full hand as the poker prize, 50 game medals, etc., per BET count "1" are given to the player. Therefore, if the maximum BET count "40" is applied, 2000 game medals, etc., are given to the player as the maximum award. When the player confirms five of a kind as the poker prize, 100 game medals, etc., per BET count "1" are given to the player. Therefore, if the maximum BET count "40" is applied, 4000 game medals, etc., are given to the player as the maximum award. When the player confirms straight flush as the poker prize, 200 game medals, etc., per BET count "1" are given to the player. Therefore, if the maximum BET count "140" is applied, 8000 game medals, etc., are given to the player as the maximum award. When the player confirms six of a kind as the poker prize, 500 game medals, etc., per BET count "1" are given to the player. Therefore, if the maximum BET count "40" is applied, 20000 game medals, etc., are given to the player as the maximum award. When the player confirms royal flush as the poker prize, 1000 game medals, etc., per BET count "1" are given to the player. Therefore, if the maximum BET count "40" is applied, 40000 game medals, etc., are given to the player as the maximum award.

The table of FIG. 23 is stored in the ROM 4 as described above, and all combinations of cards are also stored for the poker prizes.

Dealing of Poker

Then, if the player presses the start button 38, six cards are dealt based on the internal lottery using the random number generated by the random number control section 7. At this time, the six dealt cards are first displayed as face-down cards as shown on the display screen 32 in FIG. 5 or 6. If a poker prize comes into effect with the six cards in the face-down state, for example, the six cards in the face-down state are flashed as shown on the display screen 32 in FIG. 7 and further a mark such as "!" is displayed in a balloon 32*a* provided for the dealer 32*c* as shown on the display screen 32 in FIG. 8 at a high probability. On the other hand, if a poker prize does not come into effect with the six cards in the face-down state, the six cards in the face-down state may be flashed, for example, as shown on the display screen 32 in FIG. 7, but the probability that the cards will be flashed is very low. Therefore, if the player recognizes the effect of flashing the six cards and the effect of displaying a mark such as "!" in the balloon 32*a* of the dealer 32*c* just after the six cards are dealt, the player swells with the sense of anticipation that a poker prize may come into effect.

The effect of the display screen 32 just after the six cards are dealt will be discussed. The effect is produced based on a dealing effect table of FIG. 31. In the table of FIG. 31, for convenience of the description, "winning combination" is a poker prize coming into effect in the combination of six cards in the face-down state (corresponding to "deal state") or blank of a state in which a poker prize does not come into effect in the combination of six cards in the face-down state (corresponding to "deal state"). Further, if two or more poker prizes come into effect in the combination of six cards in the face-down state (corresponding to "deal state"), the poker prize corresponding to the largest award is adopted as "winning combination" (see FIG. 23).

The counter value in the table of FIG. 31 is the value of a circular arc counter provided in the RAM 5 and is any one digit of 0 to 9; it circulates regularly as 0 to 1 to 2 to 3 to 4 to 5 to 6 to 7 to 8 to 9 to 0 to . . . and one value is acquired as a random number when six cards are dealt.

According to the table of FIG. 31, when any of poker prize Nos. 1 to 4, royal flush, six of a kind, straight flush, or five of a kind, is the "winning combination," if the counter value "0" is acquired at the probability of 1/10, no effect is produced; or if any of the counter values "1" to "9" is acquired at the probability of 9/10, premium effect is produced. As the premium effect, the effect of the dealer 32*c* dancing is produced in addition to the effect of flashing six cards in the face-down state, for example, although not shown.

When any of poker prize Nos. 5 to 7, full hand, double three of a kind, or flush, is the "winning combination," if the counter value "0" or "1" is acquired at the probability of 2/10, no effect is produced; if the counter value "2" or "3" is acquired at the probability of 2/10, the effect of displaying the mark "!" in the balloon 32*d* provided for the dealer 32*c* is produced in addition to the effect of flashing six cards in the face-down state; if the counter value "4" or "5" is acquired at the probability of 2/10, the effect of displaying the mark "!!" in the balloon 32*d* provided for the dealer 32*c* is produced in addition to the effect of flashing six cards in the face-down state; if the counter value "6" or "7" is acquired at the probability of 2/10, the effect of displaying the mark "*" in the balloon 32*d* provided for the dealer 32*c* is produced in addition to the effect of flashing six cards in the face-down state; or if the counter value "8" or "9" is acquired at the probability of 2/10, the effect of displaying the mark "" in the balloon 32***d* provided for the dealer 32*c* is produced in addition to the effect of flashing six cards in the face-down state.

When any of poker prize Nos. 8 to 10, four of a kind, straight, or full house, is the "winning combination," if any of the counter values "0" to "3" is acquired at the probability of 4/10, no effect is produced; if the counter value "4" or "5" is acquired at the probability of 2/10, the effect of displaying the mark "!" in the balloon 32*d* provided for the dealer 32*c* is produced in addition to the effect of flashing six cards in the face-down state; if the counter value "6" or "7" is acquired at the probability of 2/10, the effect of displaying the mark "!!" in the balloon 32*d* provided for the dealer 32*c* is produced in addition to the effect of flashing six cards in the face-down state; or if the counter value "8" or "9" is acquired at the probability of 2/10, the effect of displaying the mark "*" in the balloon 32*d* provided for the dealer 32*c* is produced in addition to the effect of flashing six cards in the face-down state.

When any of poker prize Nos. 11 to 13, three pairs, three of a kind, or two pairs, is the "winning combination," if any of the counter values "0" to "5" is acquired at the probability of 6/10, no effect is produced; if the counter value "6" or "7" is acquired at the probability of 2/10, the effect of displaying the mark "!" in the balloon 32*d* provided for the dealer 32*c* is produced in addition to the effect of flashing six cards in the face-down state; or if the counter value "8" or "9" is acquired at the probability of 2/10, the effect of displaying the mark "!!" in the balloon 32*d* provided for the dealer 32*c* is produced in addition to the effect of flashing six cards in the face-down state.

When blank is the "winning combination," if any of the counter values "0" to "8" is acquired at the probability of 9/10, no effect is produced; or if the counter value "9" is acquired at the probability of 1/10, the effect of displaying the mark "!" in the balloon 32*d* provided for the dealer 32*c* is produced in addition to the effect of flashing six cards in the face-down state.

Figure 9:
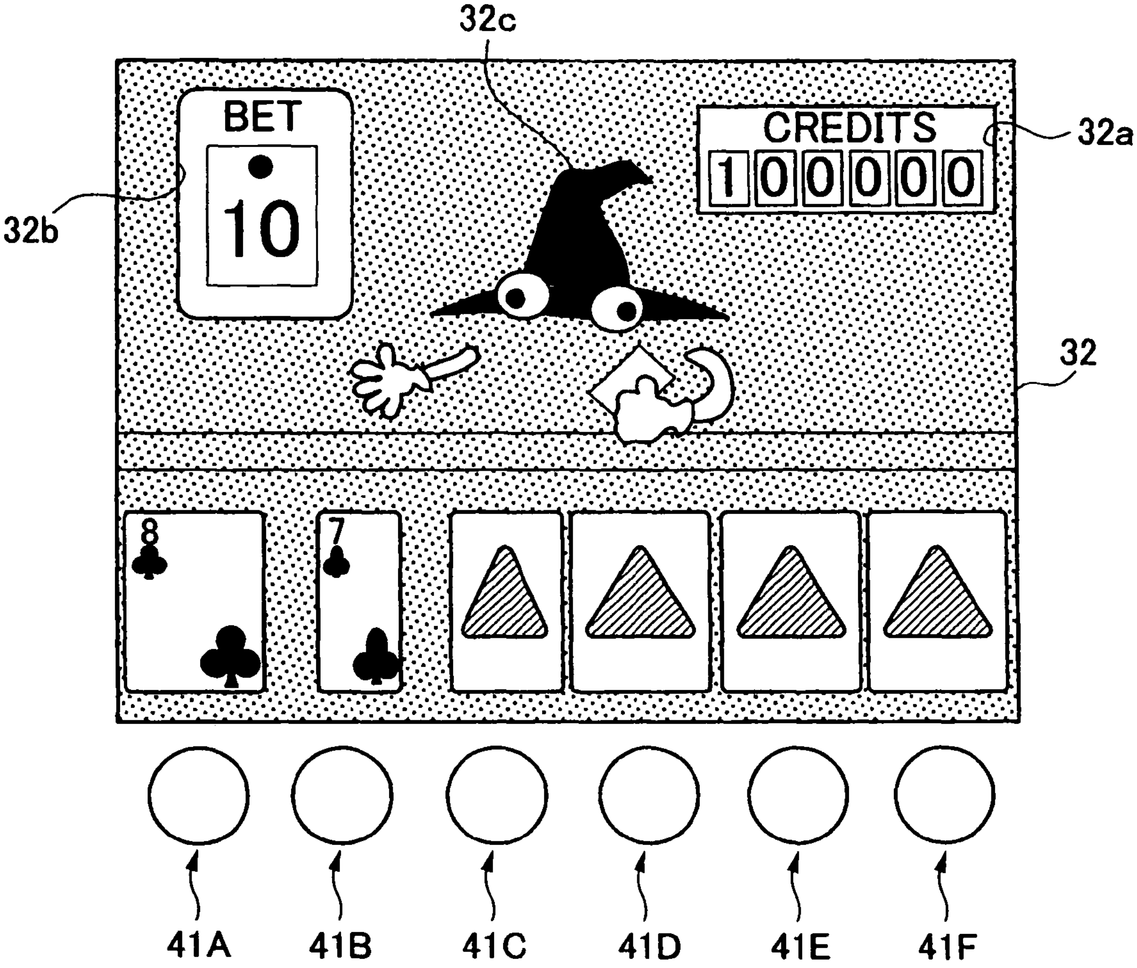
FIG. 9 is a drawing to show an example of the game contents displayed on the display screen when the poker game is developed in the poker gaming machine according to the embodiment of the invention.

On the display screen 32, the six cards in the face-down state are turned up and are displayed in order from left to right as shown on the display screen 32 in FIG. 9.

Drawing (Exchanging) of Poker

Then, on the display screen 32, for example, a character string of "HOLD AND DRAW" is displayed as shown on the display screen 32 in FIG. 10, and the player selects the card to be held from among the six cards turned up and displayed in a face-up state using any of the hold button 41A, 41B, 41C, 41D, 41E, or 41F positioned just below each card. In FIGS. 4 to 22, the hold buttons 41A, 41B, 41C, 41D, 41E, and 41F are described below the display screen 32 to clarify the positional relationship between the cards displayed in the lower center portion of the display screen 32 and the hold buttons 41A, 41B, 41C, 41D, 41E, and 41F. In fact, however, the operation table 33 intervenes between the display screen 32 and the hold buttons 41A, 41B, 41C, 41D, 41E, and 41F, as shown in FIG. 2.

Therefore, at this time, to hold the card "8 of clubs" at the left end on the display screen 32 shown in FIG. 10 by way of example, the player presses the hold button 41A positioned just below the card "8 of clubs." To hold the card "7 of clubs,"[1] the second card counted from the left end, the player presses the hold button 41B positioned just below the card "7 of clubs." To hold the card "A (1) of diamonds," the third card counted from the left end, the player presses the hold button 41C positioned just below the card "A (1) of diamonds." To hold the card "A (1) of diamonds," the third card counted from the right end, the player presses the hold button 41D positioned just below the card "A (1) of diamonds." To hold the card "6 of diamonds," the second card counted from the right end, the player presses the hold button 41E positioned just below the card "6 of diamonds." To hold the card "6 of diamonds" at the right end, the player presses the hold button 41F positioned just below the card "6 of diamonds."

At this time, if the player presses the hold button 41A, a character string of "HOLD" meaning that the card is held is superposed on the card "8 of clubs" at the left end displayed on the display screen 32. If the player presses the hold button 41B, a character string of "HELD" meaning that the card is held is superposed on the card "7 of clubs," the second card counted from the left end, displayed on the display screen 32. If the player presses the hold button 41C, a character string of "HELD" meaning that the card is held is superposed on the card "A (1) of diamonds," the third card counted from the left end, displayed on the display screen 32. If the player presses the hold button 41D, a character string of "HELD" meaning that the card is held is superposed on the card "A (1) of diamonds," the third card counted from the right end, displayed on the display screen 32. If the player presses the hold button 41E, a character string of "HELD" meaning that the card is held is superposed on the card "6 of diamonds," the second card counted from the right end, displayed on the display screen 32. If the player presses the hold button 41F, a character string of "HELD" meaning that the card is held is superposed on the card "6 of diamonds" at the right end displayed on the display screen 32.

Figure 10:
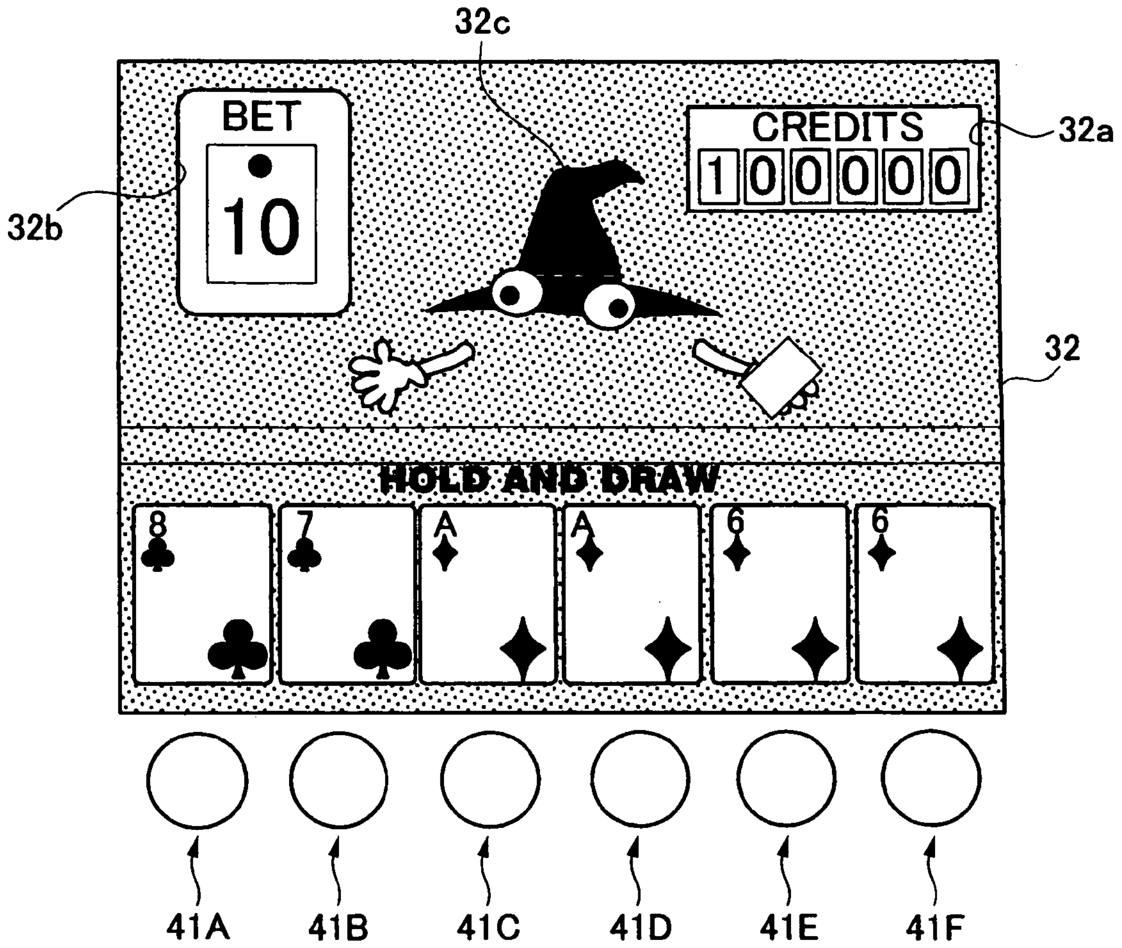
FIG. 10 is a drawing to show an example of the game contents displayed on the display screen when the poker game is developed in the poker gaming machine according to the embodiment of the invention.
Figure 11:
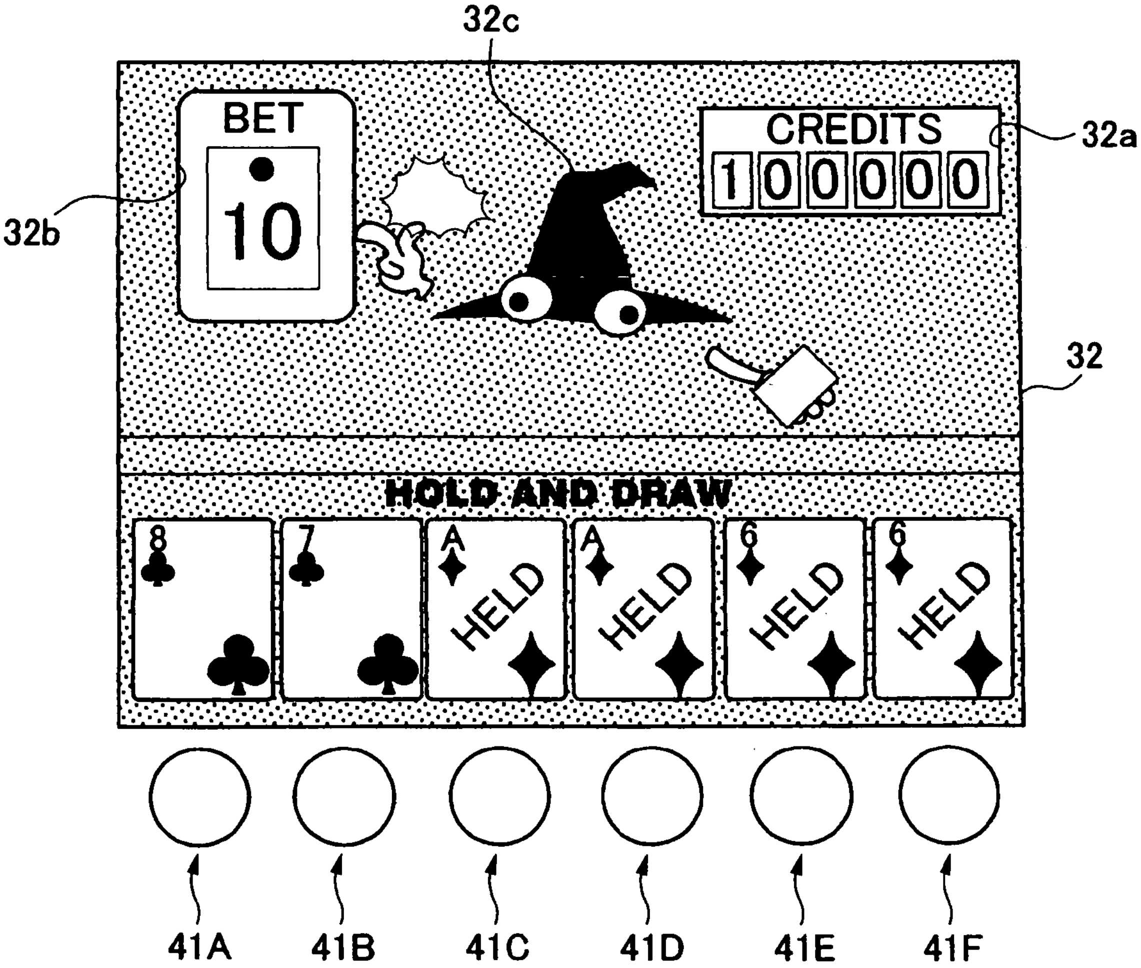
FIG. 11 is a drawing to show an example of the game contents displayed on the display screen when the poker game is developed in the poker gaming machine according to the embodiment of the invention.

In FIG. 10, for convenience of the description, it is assumed that as the result of seeing the card combination of "8 of clubs," "7 of clubs," "A (1) of diamonds," "A (1) of diamonds," "6 of diamonds," and "6 of diamonds" (corresponding to the "deal situation"), the player decides to attempt to complete flush although two pairs already come into effect and hold the four "K" cards of "A (1) of diamonds," "A (1) of diamonds," "6 of diamonds," and "6 of diamonds," and presses the hold buttons 41C, 41D, 41E, and 41F. Thus, on the display screen 32, the character string "HELD" meaning that the card is held is superposed on the card "A (1) of diamonds," the third card counted from the left end, displayed on the display screen 32, as shown in FIG. 11; the character string "HELD" meaning that the card is held is superposed on the card "A (1) of diamonds," the third card counted from the right end, displayed on the display screen 32; the character string "HELD" meaning that the card is held is superposed on the card "6 of diamonds," the second card counted from the right end, displayed on the display screen 32; and the character string "HELD" meaning that the card is held is superposed on the card "6 of diamonds" at the right end displayed on the display screen 32.

Upon completion of selecting the cards to be held, the player presses the card exchange button 40.

At this time, however, if the player does not hold any cards, he or she presses the card exchange button 40 without pressing any of the hold button 41A, 41B, 41C, 41D, 41E, or 41F.

Then, the cards not selected by the player to hold are exchanged based on internal lottery using the random number generated by the random number control section 7. At this time, on the display screen 32, the drawn (exchanged) cards are first displayed as face-down cards as shown on the display screen 32 in FIG. 12. If the drawn (exchanged) cards in the face-down state complete a poker prize in combination with the held cards (with the character string "HELD" superposed thereon in the face-up state) (corresponding to the "deal situation"), the two drawn (exchanged) cards in the face-down state may be flashed at a high probability as shown on the display screen 32 in FIG. 13, for example.

Further, the drawn cards in the face-down state are turned up and are displayed.

Figure 14:
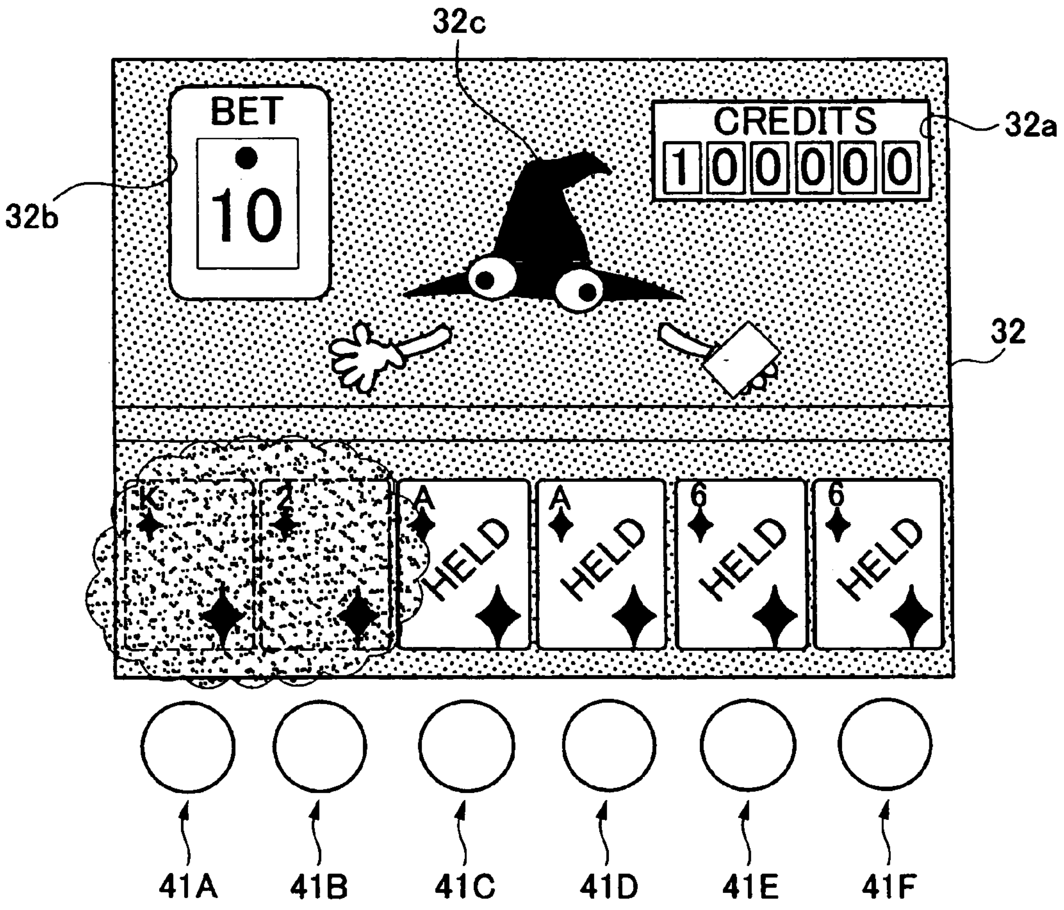
FIG. 14 is a drawing to show an example of the game contents displayed on the display screen when the poker game is developed in the poker gaming machine according to the embodiment of the invention.
Figure 15:
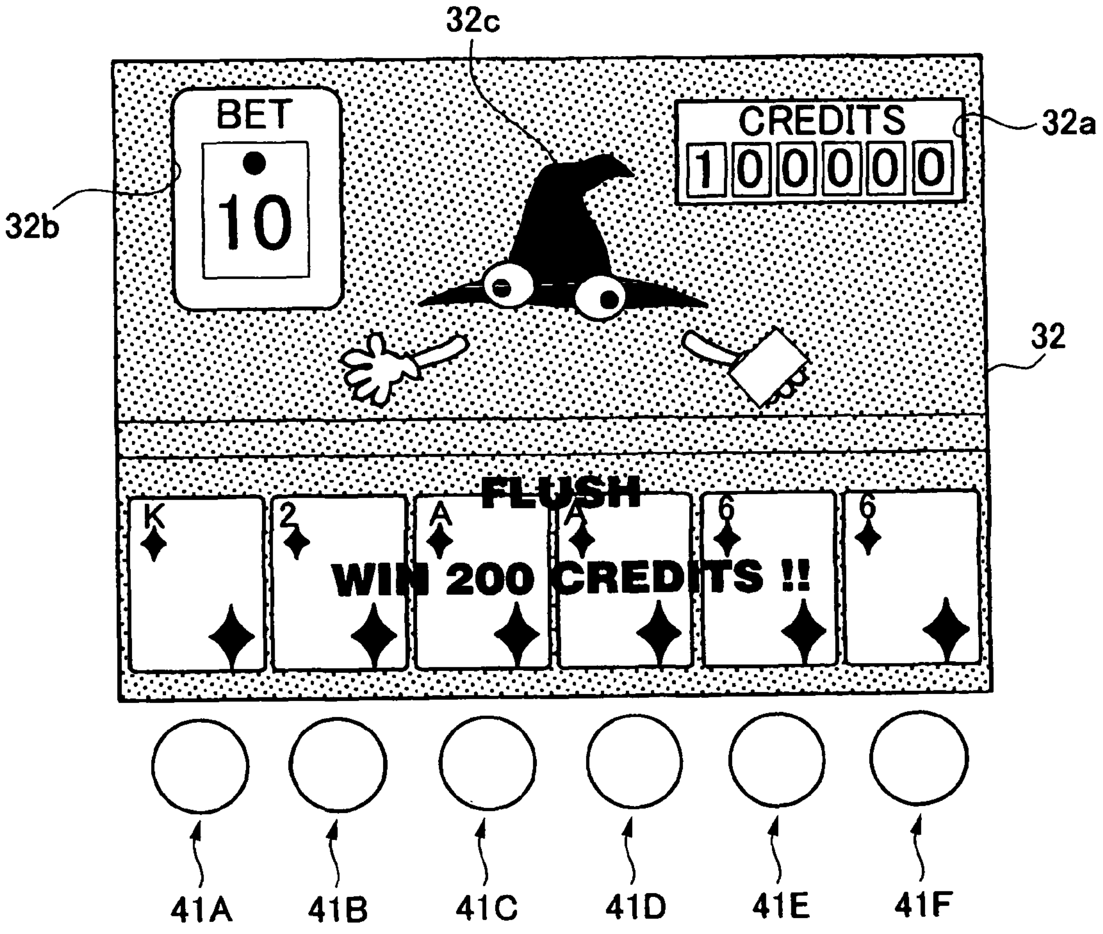
FIG. 15 is a drawing to show an example of the game contents displayed on the display screen when the poker game is developed in the poker gaming machine according to the embodiment of the invention.
Figure 16:
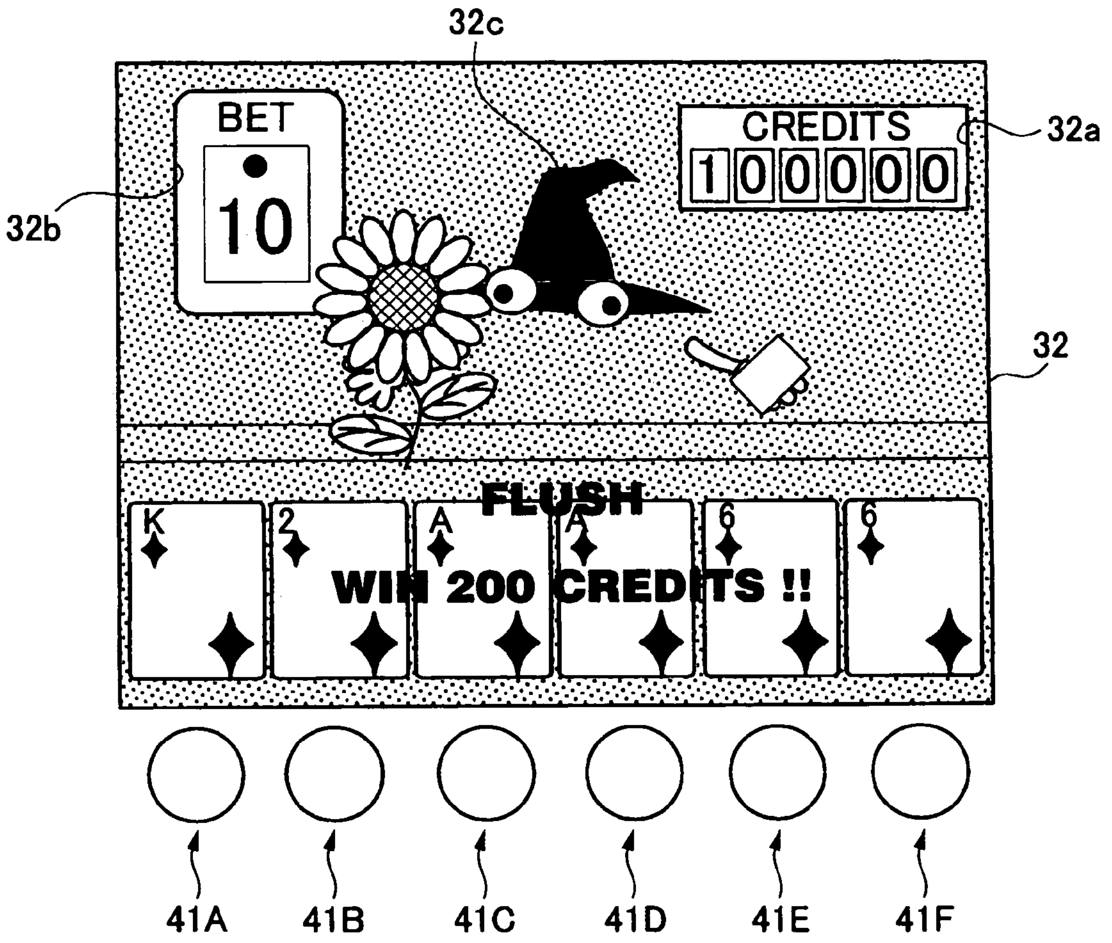
FIG. 16 is a drawing to show an example of the game contents displayed on the display screen when the poker game is developed in the poker gaming machine according to the embodiment of the invention.

Here, if the turned-up and displayed cards complete a poker prize in combination with the held cards (with the character string "HELD" superposed thereon in the face-up state) (corresponding to the "deal situation"), for example, the turned-up and displayed cards may be covered with a smoke screen in a moment at a high probability as shown on the display screen 32 in FIG. 14.

Figure 13:
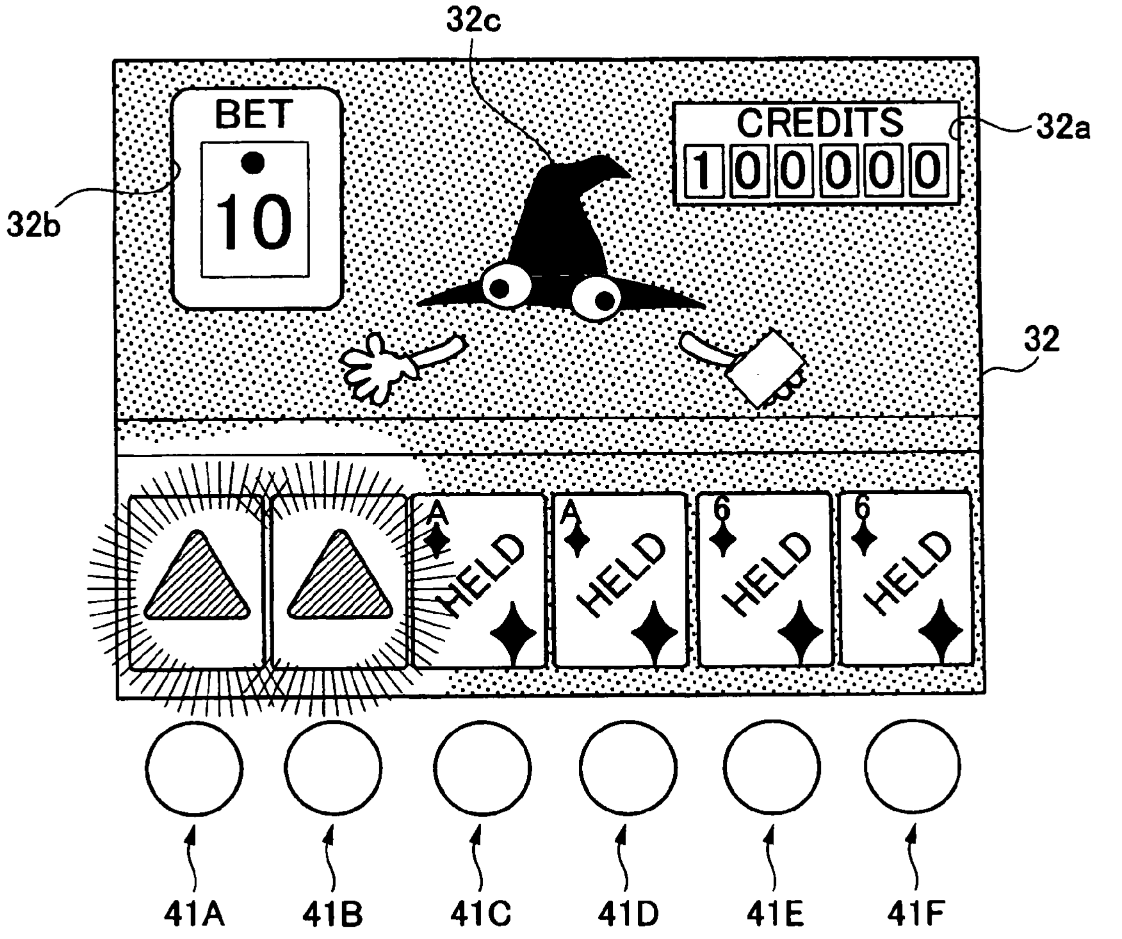
FIG. 13 is a drawing to show an example of the game contents displayed on the display screen when the poker game is developed in the poker gaming machine according to the embodiment of the invention.

On the other hand, if the drawn cards in the face-down state do not complete a poker prize in combination with the held cards (with the character string "HELD" superposed thereon in the face-up state) (corresponding to the "deal situation"), the two drawn cards in the face-down state may be flashed as shown on the display screen 32 in FIG. 13, for example. However, the probability that the cards may be flashed is very low. Therefore, if the player recognizes the effect of flashing the drawn cards or the effect of covering the turned-up and displayed cards with a smoke screen in a moment just after the cards are drawn, the player swells with the sense of anticipation that a poker prize may come into effect according to the combination of the drawn cards in the face-down state and the held cards (with the character string "HELD" superposed thereon in the face-up state).

The effect of the display screen 32 just after the cards are drawn will be discussed. This effect is produced based on a draw deal effect table of FIG. 32. In the table of FIG. 32, for convenience of the description, "winning combination" is a poker prize coming into effect in the combination of the drawn cards in the face-down state and the held cards (with the character string "HELD" superposed thereon in the face-up state) (corresponding to "deal state") or blank of a state in which a poker prize does not come into effect in the combination of the drawn cards in the face-down state and the held cards (with the character string "HELD" superposed thereon in the face-up state) (corresponding to "deal state"). Further, if two or more poker prizes come into effect in the combination of the drawn cards in the face-down state and the held cards (with the character string "HELD" superposed thereon in the face-up state) (corresponding to "deal state"), the poker prize corresponding to the largest award is adopted as "winning combination" (see FIG. 23).

The counter value in the table of FIG. 32 is the value of a counter provided in the RAM 5 and is any one digit of 0 to 9; it circulates regularly as 0 to 1 to 2 to 3 to 4 to 5 to 6 to 7 to 8 to 9 to 0 to . . . and one value is acquired when the card is drawn.

According to the table of FIG. 32, when any of poker prize Nos. 1 to 4, royal flush, six of a kind, straight flush, or five of a kind, is the "winning combination," if the counter value "0" is acquired at the probability of 1/10, no effect is produced; or if any of the counter values "1" to "9" is acquired at the probability of 9/10, premium effect is produced. As the premium effect, the effect of the dealer 32*c* dancing is produced in addition to the effect of flashing the drawn cards in the face-down state, for example, although not shown.

When any of poker prize Nos. 5 to 7, full hand, double three of a kind, or flush, is the "winning combination," if the counter value "0" or "1" is acquired at the probability of 2/10, no effect is produced; if the counter value "2" or "3" is acquired at the probability of 2/10, the effect of flashing the drawn cards in the face-down state is produced; if the counter value "4" or "5" is acquired at the probability of 2/10, the effect of covering the turned-up and displayed cards with a smoke screen in a moment is produced in addition to the effect of flashing the drawn cards in the face-down state; if the counter value "6" or "7" is acquired at the probability of 2/10, the effect of enveloping the turned-up and displayed cards in flames in a moment is produced in addition to the effect of flashing the drawn cards in the face-down state; or if the counter value "8" or "9" is acquired at the probability of 2/10, the effect of striking the turned-up and displayed cards by lightning is produced in addition to the effect of flashing six cards in the face-down state.

When any of poker prize Nos. 8 to 10, four of a kind, straight, or full house, is the "winning combination," if any of the counter values "0" to "3" is acquired at the probability of 4/10, no effect is produced; if the counter value "4" or "5" is acquired at the probability of 2/10, the effect of flashing the drawn cards in the face-down state is produced; if the counter value "6" or "7" is acquired at the probability of 2/10, the effect of covering the turned-up and displayed cards with a smoke screen in a moment is produced in addition to the effect of flashing the drawn cards in the face-down state; or if the counter value "8" or "9" is acquired at the probability of 2/10, the effect of enveloping the turned-up and displayed cards in flames in a moment is produced in addition to the effect of flashing the drawn cards in the face-down state.

When any of poker prize Nos. 11 to 13, three pairs, three of a kind, or two pairs, is the "winning combination," if any of the counter values "0" to "5" is acquired at the probability of 6/10, no effect is produced; if the counter value "6" or "7" is acquired at the probability of 2/10, the effect of flashing the drawn cards in the face-down state is produced; or if the counter value "8" or "9" is acquired at the probability of 2/10, the effect of covering the turned-up and displayed cards with a smoke screen in a moment is produced in addition to the effect of flashing the drawn cards in the face-down state.

When blank is the "winning combination," if any of the counter values "0" to "8" is acquired at the probability of 9/10, no effect is produced; or if the counter value "9" is acquired at the probability of 1/10, the effect of flashing the drawn cards in the face-down state is produced.

On the display screen 32, when it becomes possible for the player to clearly visually recognize the cards after the drawn cards in the face-down state are turned up, if the six cards of the player made up of the drawn cards and the held cards (with the character string "HELD" superposed thereon in the face-up state) complete a poker prize, the poker prize and its award are displayed and further the blessing effect of the dealer 32*c* is produced. For example, character strings "FLUSH" AND "WIN 200 CREDITS!!" are superposed on the six cards of the player as shown on the display screen 32 in FIG. 15 and further the blessing effect of presenting a flower out of a hat by the dealer 32*c* is produced as shown on the display screen 32 in FIG. 16.

On the other hand, if the six cards of the player made up of the drawn cards and the held cards (with the character string "HELD" superposed thereon in the face-up state) do not complete a poker prize, a message of game over is displayed on the display screen 32 and then the screen returns to the title screen in the standby state. For example, a character string of "YOU LOSE . . . " is superposed on the six cards as shown on the display screen 32 in FIG. 17 and then the screen returns to the title screen in the standby state as shown on the display screen 32 in FIG. 4.

Double Down Game

If the blessing effect of the dealer 32*c* is produced on the display screen 32, for example, a message as shown in FIG. 18 is displayed, prompting the player to specify whether or not to try a double down game. If the player does not press the double down button 39 within a predetermined time, development to a double down game is not conducted and the award (the acquired number of game medals, etc.,) is confirmed and the screen returns to the title screen in the standby state as shown on the display screen 32 in FIG. 4. The poker gaming machine 1 of the embodiment checks to ensure that the player does not intend to try a double down game by the fact that a given time has elapsed since the message as shown in FIG. 18 was displayed on the display screen 32. It may check that the player does not intend to try a double down game by the fact that the player immediately presses the hold button 41A, 41B, 41C, 41D, 41E, or 41F, any other button than the hold button 41A, 41B, 41C, 41D, 41E, or 41F or the double down button 39, or a newly provided dedicated button.

On the other hand, if the player presses the double down button 39 within the predetermined time, development to a double down game is conducted. First, a double down game start screen is displayed as shown on the display screen 32 in FIG. 19.

Then, on the display screen 32, one card of the dealer is dealt based on internal lottery using the random number generated by the random number control section 7 and is displayed as a face-up card and further five cards are dealt to the player and are displayed as face-down cards. For example, the card of the dealer, "5 of diamonds," is dealt and is displayed at the right end in the face-up state and the five cards of the player are dealt and are displayed as the second card from the left end to the card at the right end in the face-down state as shown on the display screen 32 in FIG. 20.

Figure 21:
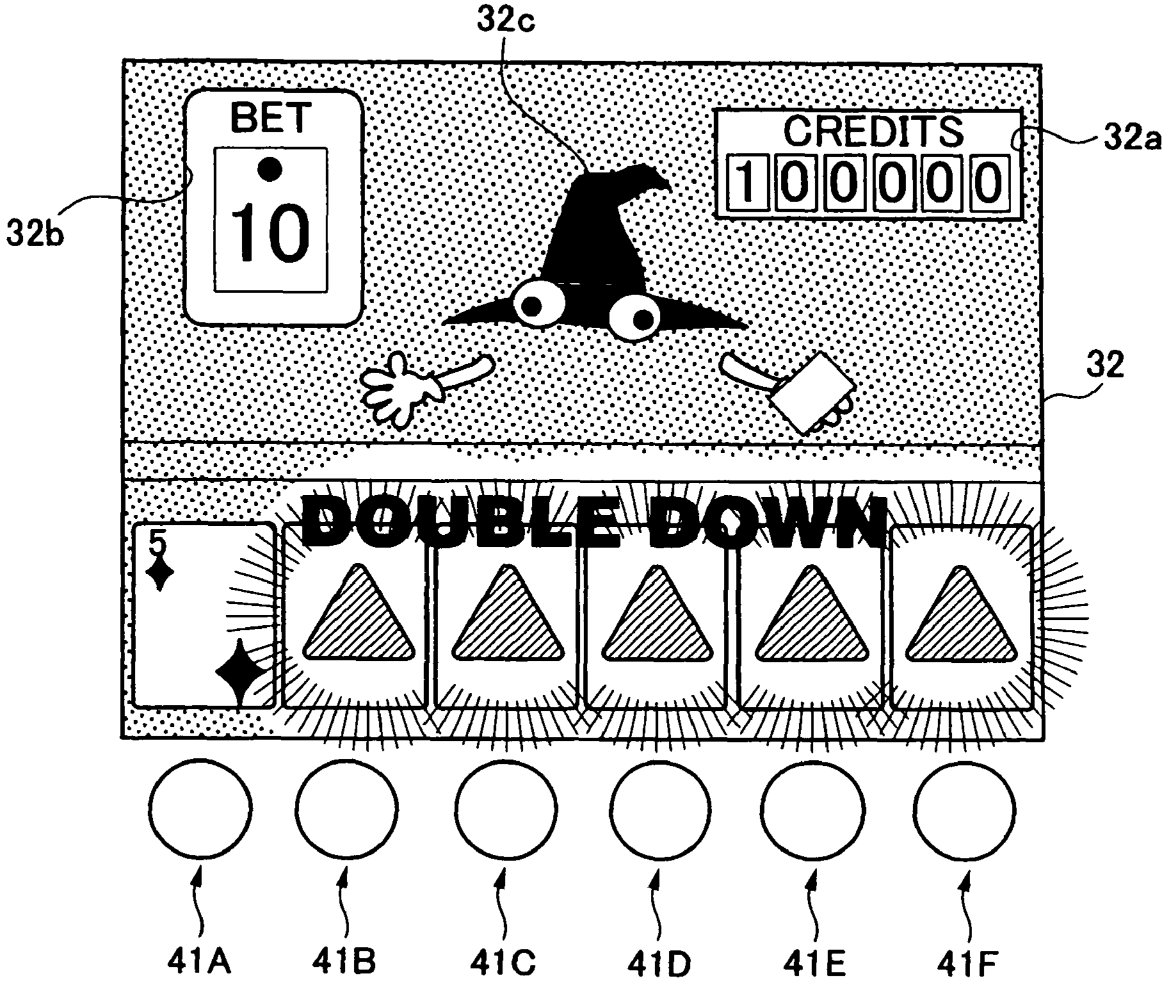
FIG. 21 is a drawing to show an example of the game contents displayed on the display screen when the double down game is developed in the poker gaming machine according to the embodiment of the invention.

If the five cards of the player in the face-down state contain a card greater than the card of the dealer in the face-up state, at a high probability, the five cards of the player in the face-down state are flashed, for example, as shown on the display screen 32 in FIG. 21 and further the dealer 32*c* gets giddy, goes faint, etc., although not shown. On the other hand, if the five cards of the player in the face-down state do not contain any card greater than the card of the dealer in the face-up state, the five cards of the player in the face-down state are not flashed and the dealer 32*c* does not get giddy, does not go faint, etc. Therefore, if the player recognizes the effect of flashing the five cards or the effect of displaying the dealer 32*c* who gets giddy, goes faint, etc., just after the five cards are dealt to the player and are displayed as face-down cards, the player swells with the sense of anticipation that the five cards dealt to the player as the face-down cards may contain a card greater than the card of the dealer in the face-up state.

The effect of the display screen 32 just after the five cards are dealt to the player and are displayed as face-down cards will be discussed. This effect is produced based on a double down game deal effect table of FIG. 33. In the table of FIG. 33, for convenience of the description, "number of win cards" is the number of cards of the five cards of the player in the face-down state greater than the card of the dealer in the face-up state.

The counter value in the table of FIG. 33 is the value of a counter provided in the RAM 5 and is any one digit of 0 to 9; it circulates regularly as 0 to 1 to 2 to 3 to 4 to 5 to 6 to 7 to 8 to 9 to 0 to . . . and one value is acquired when five cards are dealt to the player and are displayed as face-down cards.

According to the table of FIG. 33, when the "number of win cards" is five, if the counter value "0" or "1" is acquired at the probability of 2/10, no effect is produced; if the counter value "2" or "3" is acquired at the probability of 2/10, the effect of flashing the five cards of the player in the face-down state is produced; if the counter value "4" or "5" is acquired at the probability of 2/10, the effect of making the dealer 32*c* get giddy is produced in addition to the effect of flashing the five cards of the player in the face-down state; if the counter value "6" or "7" is acquired at the probability of 2/10, the effect of flashing the five cards of the player in the face-down state at random is produced; or if the counter value "8" or "9" is acquired at the probability of 2/10, the effect of making the dealer 32*c* go faint is produced in addition to the effect of heavily flashing the five cards of the player in the face-down state.

When the "number of win cards" is four or three, if any of the counter values "0" to "3" is acquired at the probability of 4/10, no effect is produced; if any of the counter values "4" to "6" is acquired at the probability of 3/10, the effect of flashing the five cards of the player in the face-down state is produced; or if any of the counter values "7" to "9" is acquired at the probability of 3/10, the effect of making the dealer 32*c* get giddy is produced in addition to the effect of flashing the five cards of the player in the face-down state.

When the "number of win cards" is two or one, if any of the counter values "0" to "5" is acquired at the probability of 6/10, no effect is produced; or if any of the counter values "6" to "9" is acquired at the probability of 4/10, the effect of flashing the five cards of the player in the face-down state is produced.

When the "number of win cards" is zero, if any of the counter values "0" to "9" is acquired at the probability of 10/10, no effect is produced.

Figure 22:
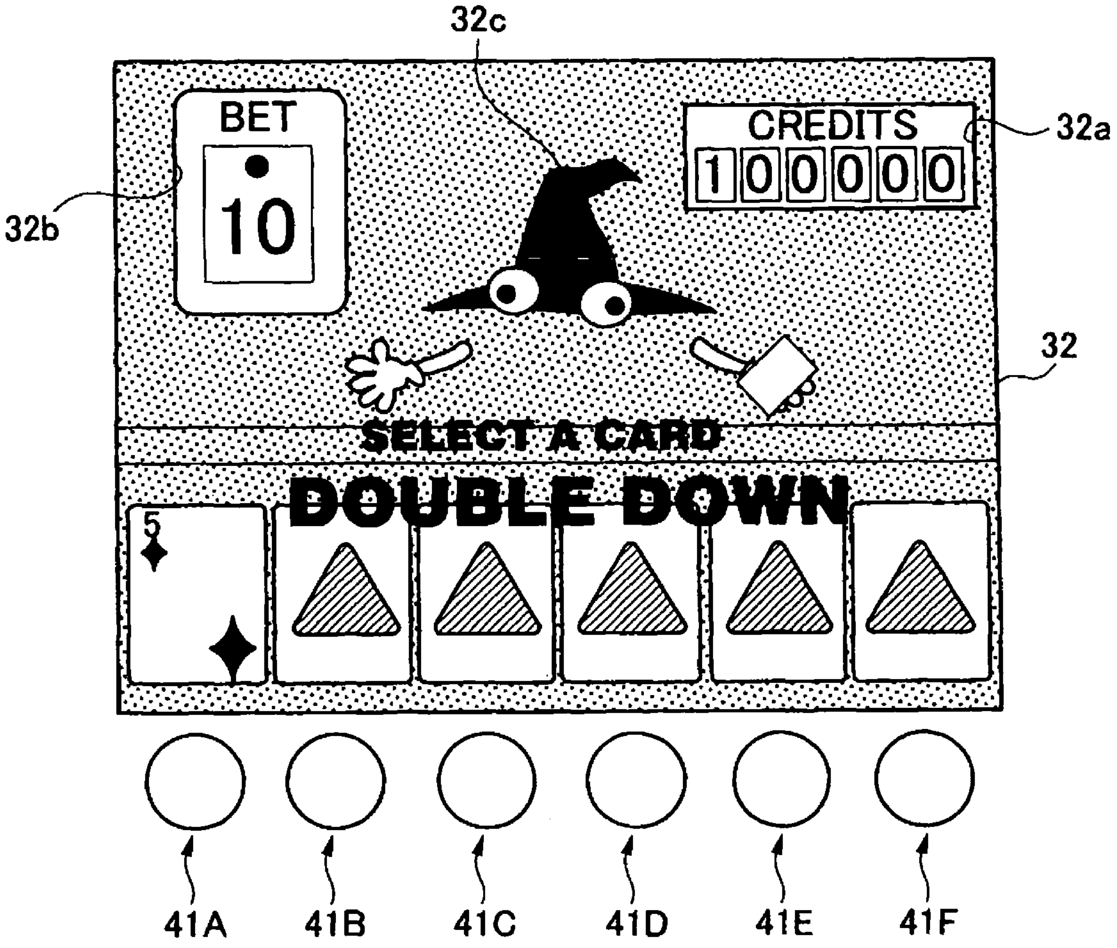
FIG. 22 is a drawing to show an example of the game contents displayed on the display screen when the double down game is developed in the poker gaming machine according to the embodiment of the invention.

Then, a character string of "SELECT A CARD" is displayed as shown on the display screen 32 in FIG. 22, prompting the player to select one from among the five cards dealt to the player as the face-down cards. At this time, the player selects a card in a similar manner to that of selecting the card to be held in the poker game described above; the player presses any of the hold button 41A, 41B, 41C, 41D, 41E, or 41F positioned below the five cards dealt to the player as the face-down cards.

The card selected by the player pressing any of the hold button 41A, 41B, 41C, 41D, 41E, or 41F is turned up and is displayed. At this time, if the user-selected turned-up card is greater than the card of the dealer in the face-up state, the player wins the game (the dealer loses the game) and doubling the award (the acquired number of game medals, etc.,) as a benefit is confirmed and the screen returns to the title screen in the standby state as shown on the display screen 32 in FIG. 4. On the other hand, if the user-selected turned-up card is smaller than the card of the dealer in the face-up state, the player loses the game (the dealer wins the game) and a character string of "YOU LOSE . . . " is superposed on the six cards, for example, as shown on the display screen 32 in FIG. 17 and then the screen returns to the title screen in the standby state as shown on the display screen 32 in FIG. 4.

If the player wins the game (the dealer loses the game), the message as shown on the display screen 32 in FIG. 18 may be displayed, prompting the player to specify whether or not to again try a double down game.

Next, the control operation of the game control apparatus 2 for a poker game and a double down game in the poker gaming machine 1 of the embodiment will be discussed based on FIG. 1 and FIGS. 24 to 30. FIG. 1 and FIGS. 24 to 30 are flowcharts to show the game control operation of the game control apparatus 2. The programs shown in the flowcharts of FIG. 1 and FIGS. 24 to 30 are stored in the ROM 4 and are executed by the CPU 3 of the game control apparatus 2.

Figure 24:
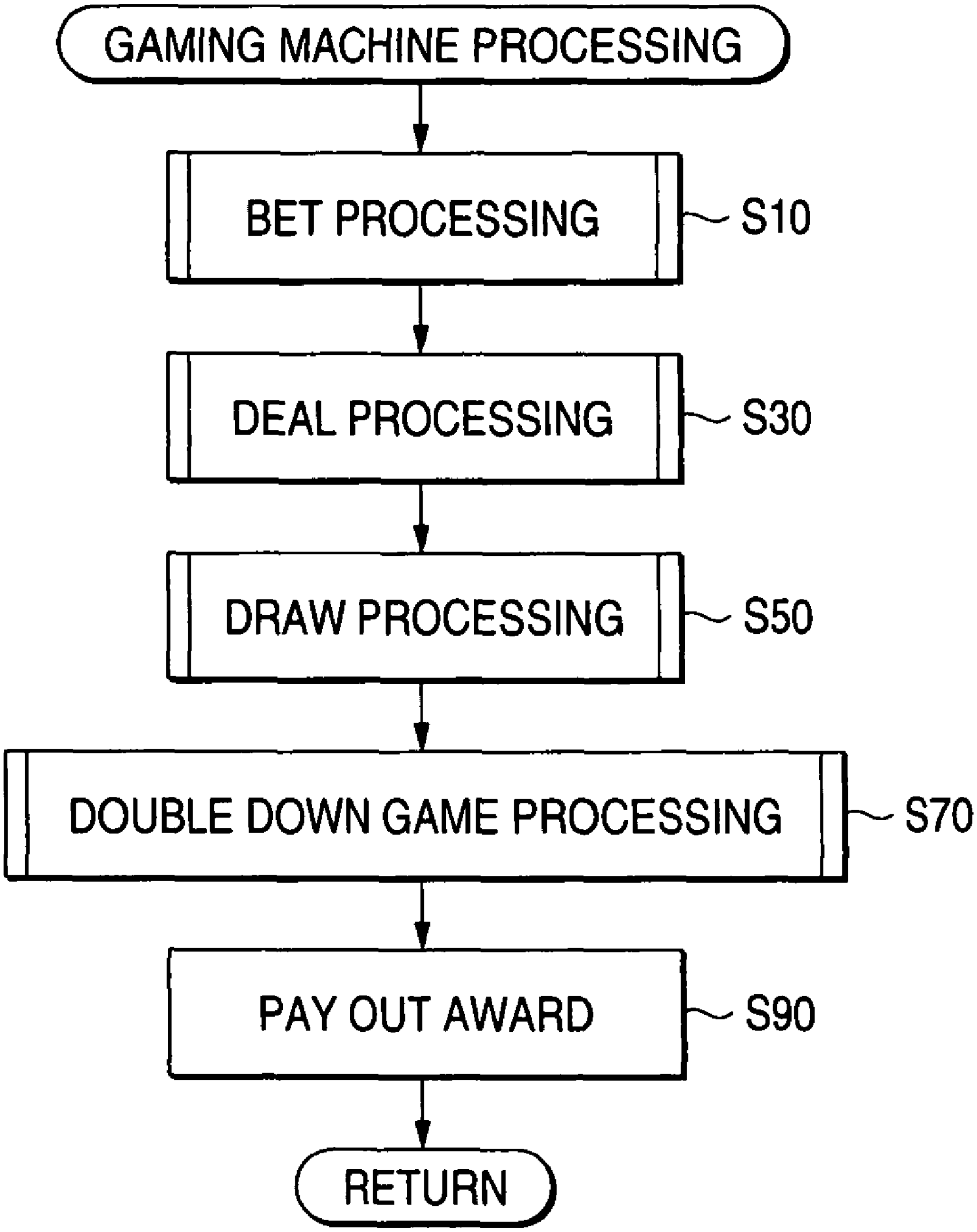
FIG. 24 is a flowchart to show the game control operation of the game control apparatus in the poker gaming machine according to the embodiment of the invention.
Figure 25:
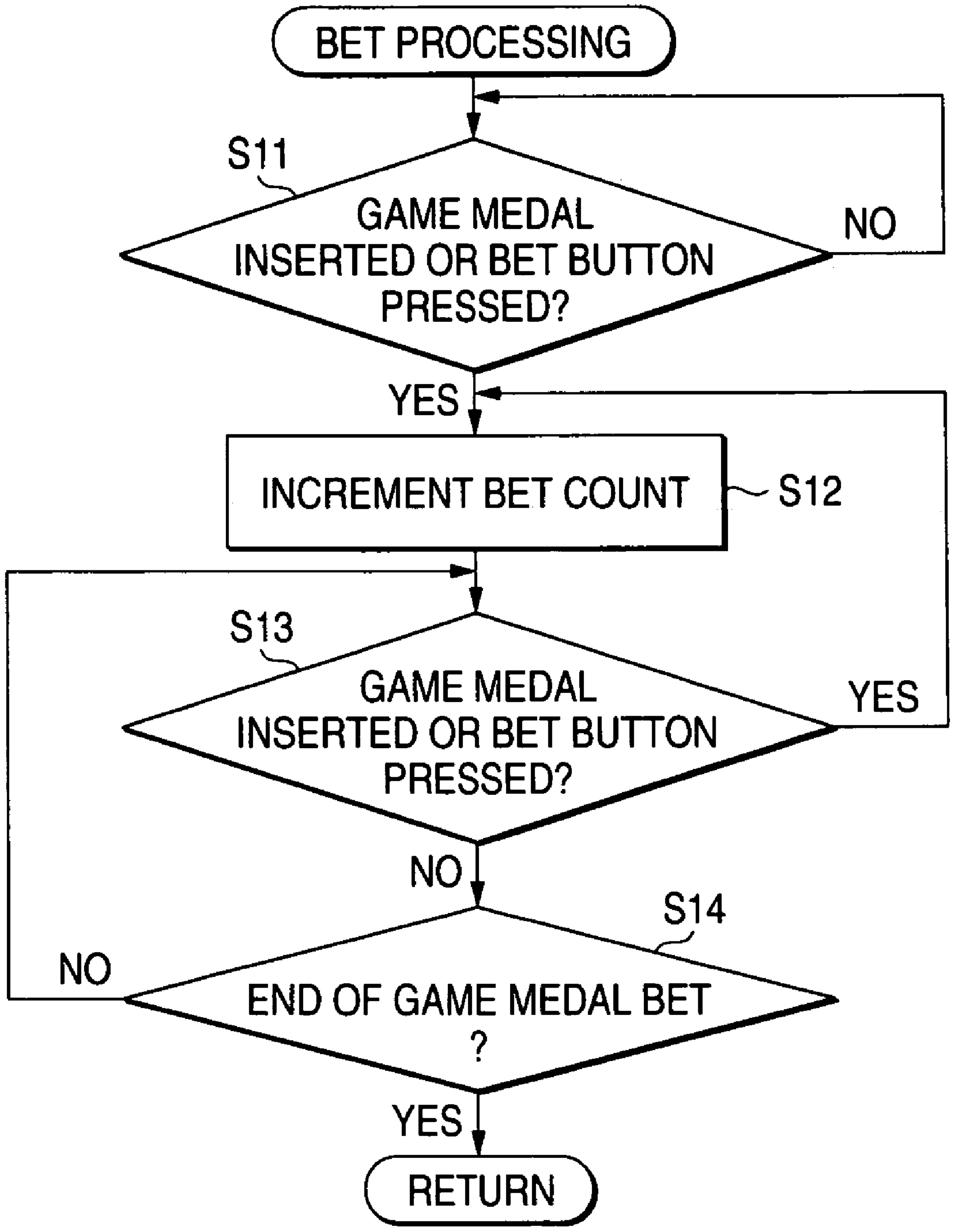
FIG. 25 is a flowchart to show the game control operation of the game control apparatus in the poker gaming machine according to the embodiment of the invention.

In the poker gaming machine 1 of the embodiment, gaming machine processing in FIG. 24 is executed and first, bet processing in FIG. 25 is performed at step 10 (S10).

Then, the bet processing in FIG. 25 will be discussed. First, at S11, whether or not a game medal is inserted or whether or not the player presses the BET button 37 is determined, and the program waits until the player inserts a game medal or presses the BET button 37 (NO at S11). This determination is made by the fact that the CPU 3 receives a switch signal from the BET switch 13 based on pressing the BET button 37 or a medal detection signal from the medal sensor 12. When it is determined that the player inserts a game medal or presses the BET button 37 (YES at S11), the process goes to S12.

At S12, the BET count is incremented, namely, one is added to the BET count in the storage area provided in the RAM 5 and then the process goes to S13.

At S13, again whether or not a game medal is inserted or whether or not the player presses the BET button 37 is determined. This determination is also made by the fact that the CPU 3 receives a switch signal from the BET switch 13 based on pressing the BET button 37 or a medal detection signal from the medal sensor 12. At this time, when it is determined that the player inserts a game medal or presses the BET button 37 (YES at S13), the process returns to S12 and the above-described processing is repeated. On the other hand, when it is not determined that the player inserts a game medal or presses the BET button 37 (NO at S13), the process goes to S14.

Figure 26:
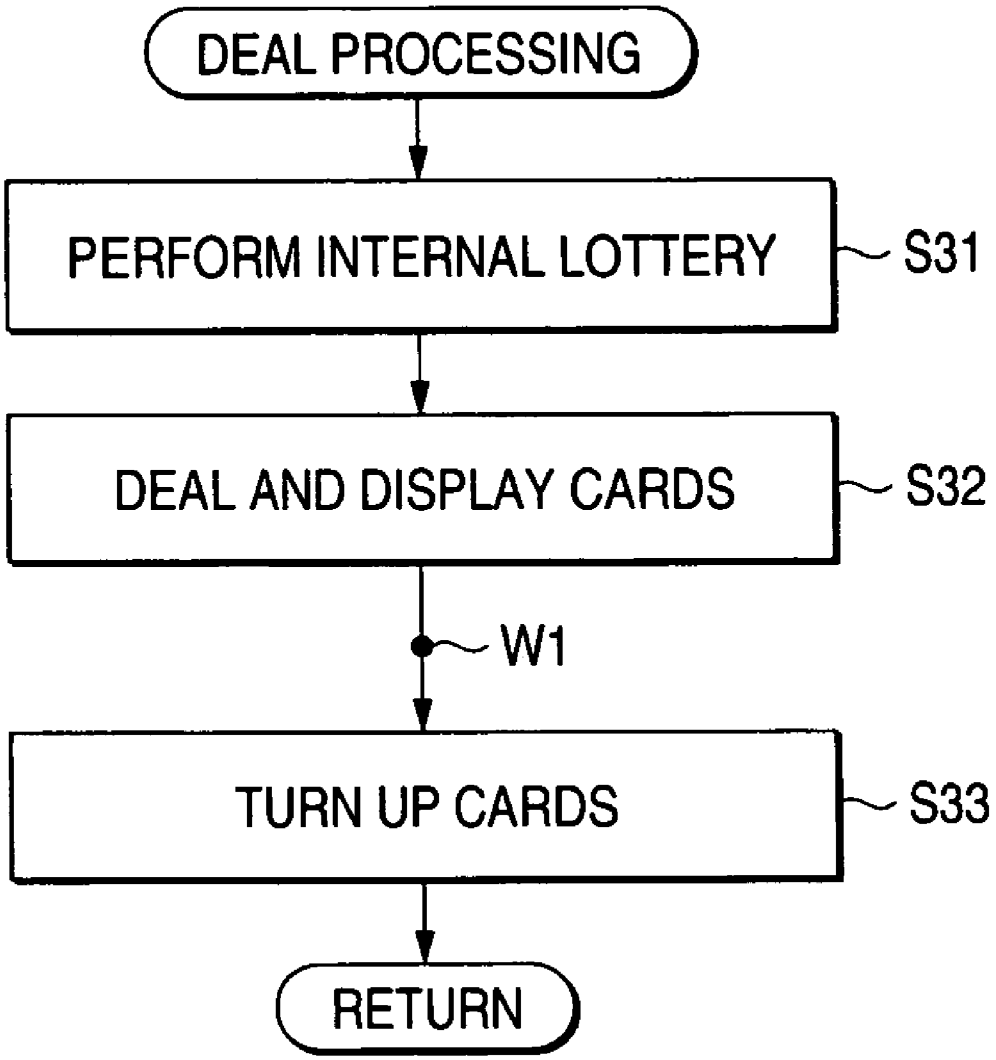
FIG. 26 is a flowchart to show the game control operation of the game control apparatus in the poker gaming machine according to the embodiment of the invention.

At S14, whether or not the operation of inserting a game medal or pressing the BET button 37 is complete is determined. This determination is made by the fact that the CPU 3 receives a switch signal from the start switch 15 based on pressing the start button 38. At this time, if it is not determined that the operation of inserting a game medal or pressing the BET button 37 is complete (NO at S14), the process returns to S13 and the above-described processing is repeated. On the other hand, if it is determined that the operation of inserting a game medal or pressing the BET button 37 is complete (YES at S14), the BET count is confirmed and the routine returns to the gaming machine processing in FIG. 24 and at S30, deal processing in FIG. 26 is performed.

Then, the deal processing in FIG. 26 will be discussed. First, at S31, internal lottery processing concerning the cards to be dealt is performed. In this processing, the CPU 3 transmits a random number generation instruction to the random number control section 7, which then samples a random number upon reception of the signal. The random number provided by the random number control section 7 is stored in the RAM 5 as the random number indicating the lottery result. The CPU 3 references the lottery table stored in the ROM 4 and determines the types of cards (to be dealt) corresponding to the random number. After storing the data concerning the card types in the RAM 5, the CPU 3 goes to S32.

Figure 5:
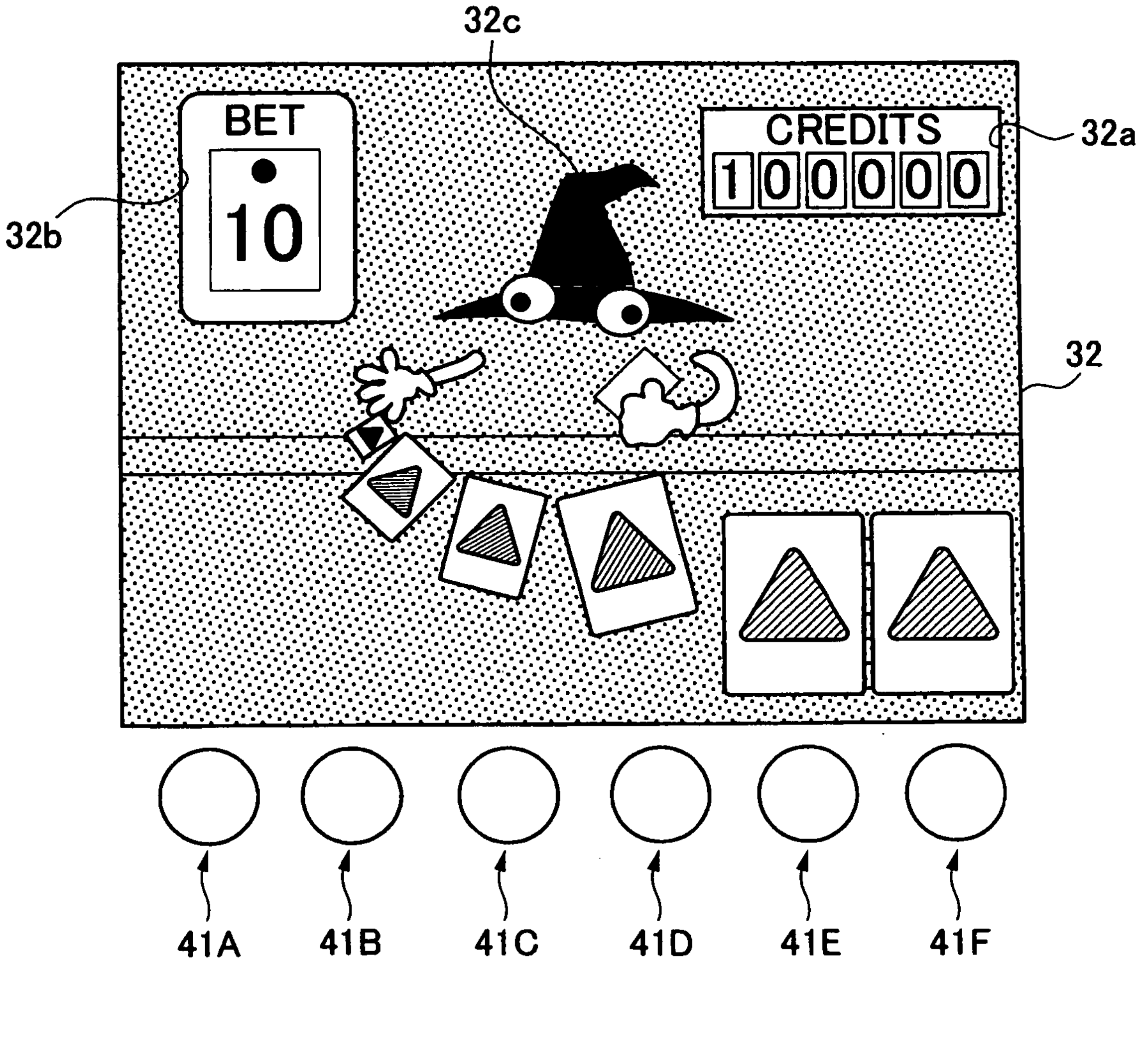
FIG. 5 is a drawing to show an example of the game contents displayed on the display screen when a poker game is developed in the poker gaming machine according to the embodiment of the invention.
Figure 6:
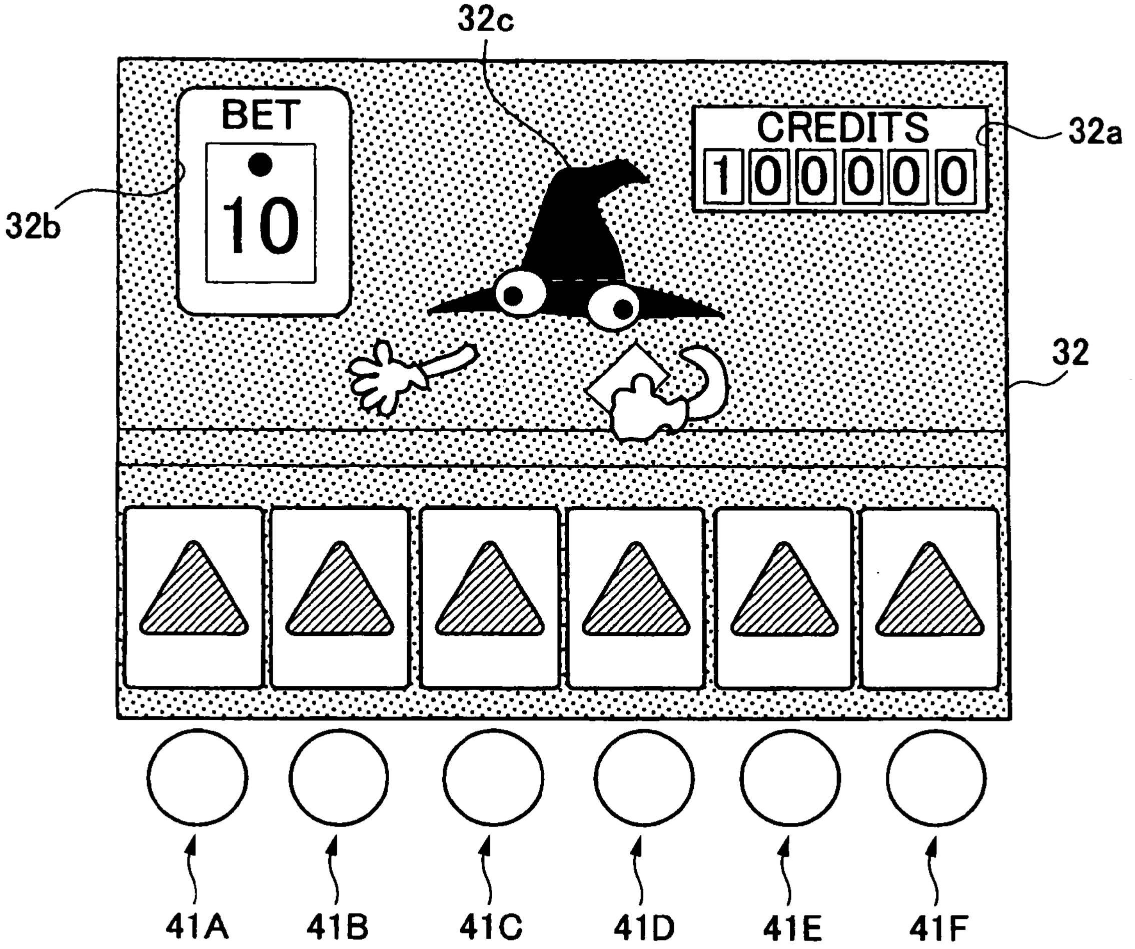
FIG. 6 is a drawing to show an example of the game contents displayed on the display screen when the poker game is developed in the poker gaming machine according to the embodiment of the invention.
Figure 7:
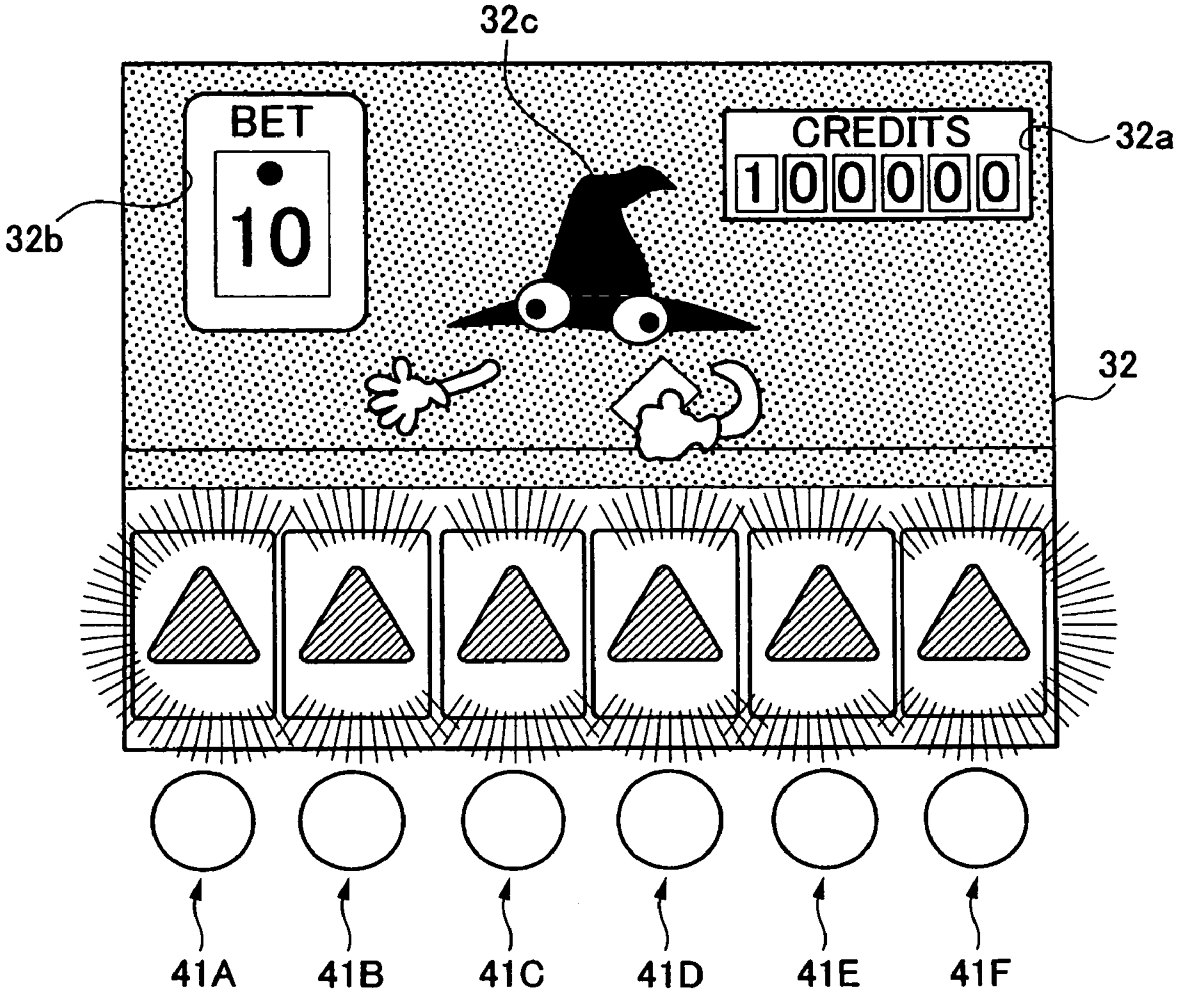
FIG. 7 is a drawing to show an example of the game contents displayed on the display screen when the poker game is developed in the poker gaming machine according to the embodiment of the invention.
Figure 8:
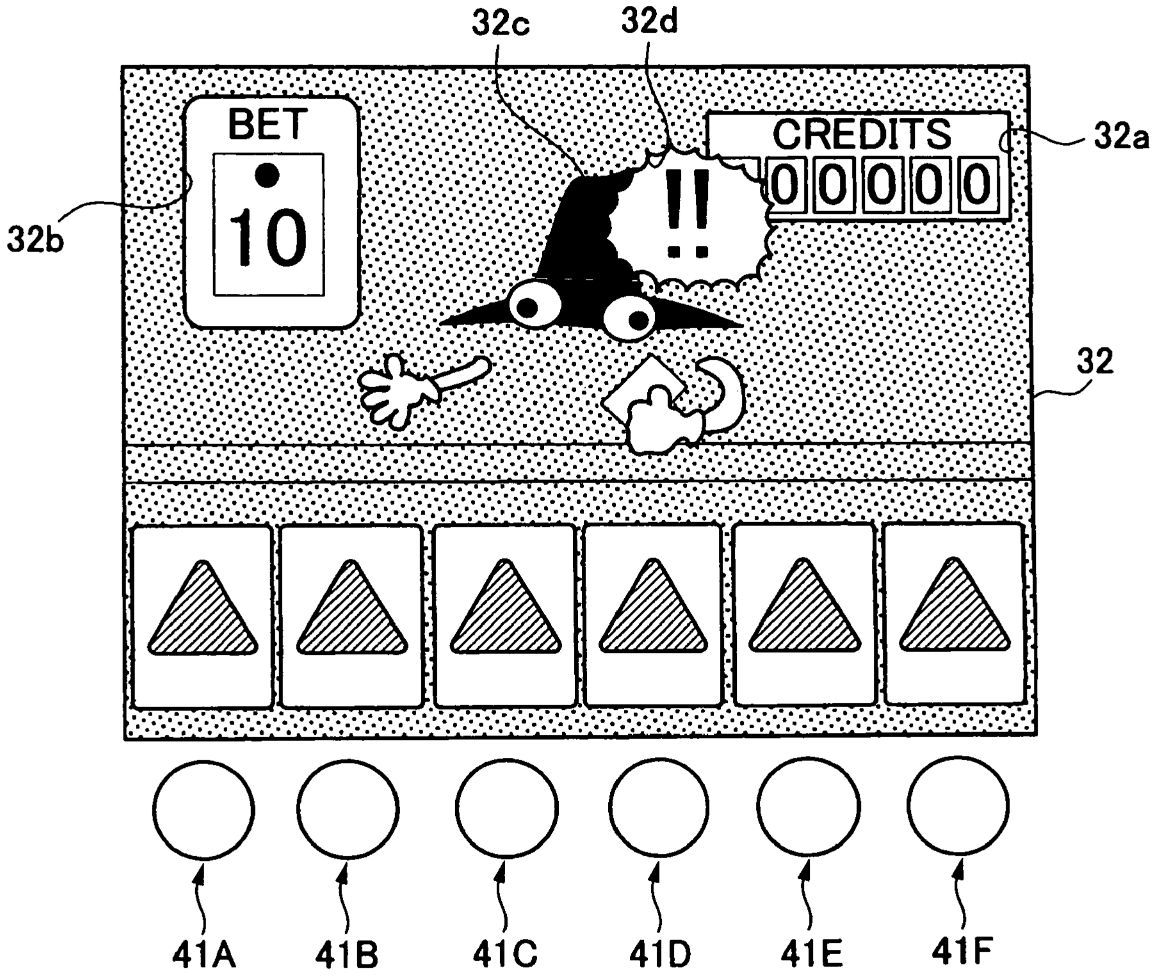
FIG. 8 is a drawing to show an example of the game contents displayed on the display screen when the poker game is developed in the poker gaming machine according to the embodiment of the invention.

At S32, the CPU 3 transmits a display instruction to the image display drive circuit 23, which then deals and displays six cards in a face-down state on the display screen 32 upon reception of the signal (see FIGS. 5 and 6). At S33, the CPU 3 also transmits a display instruction to the image display drive circuit 23, which then turns up the six cards in order from left to right on the display screen 32 upon reception of the signal (see FIG. 9). At the time, the symbols on the six turned-up cards are matched with those corresponding to the data concerning the card types stored in the RAM 5 at S32.

Figure 27:
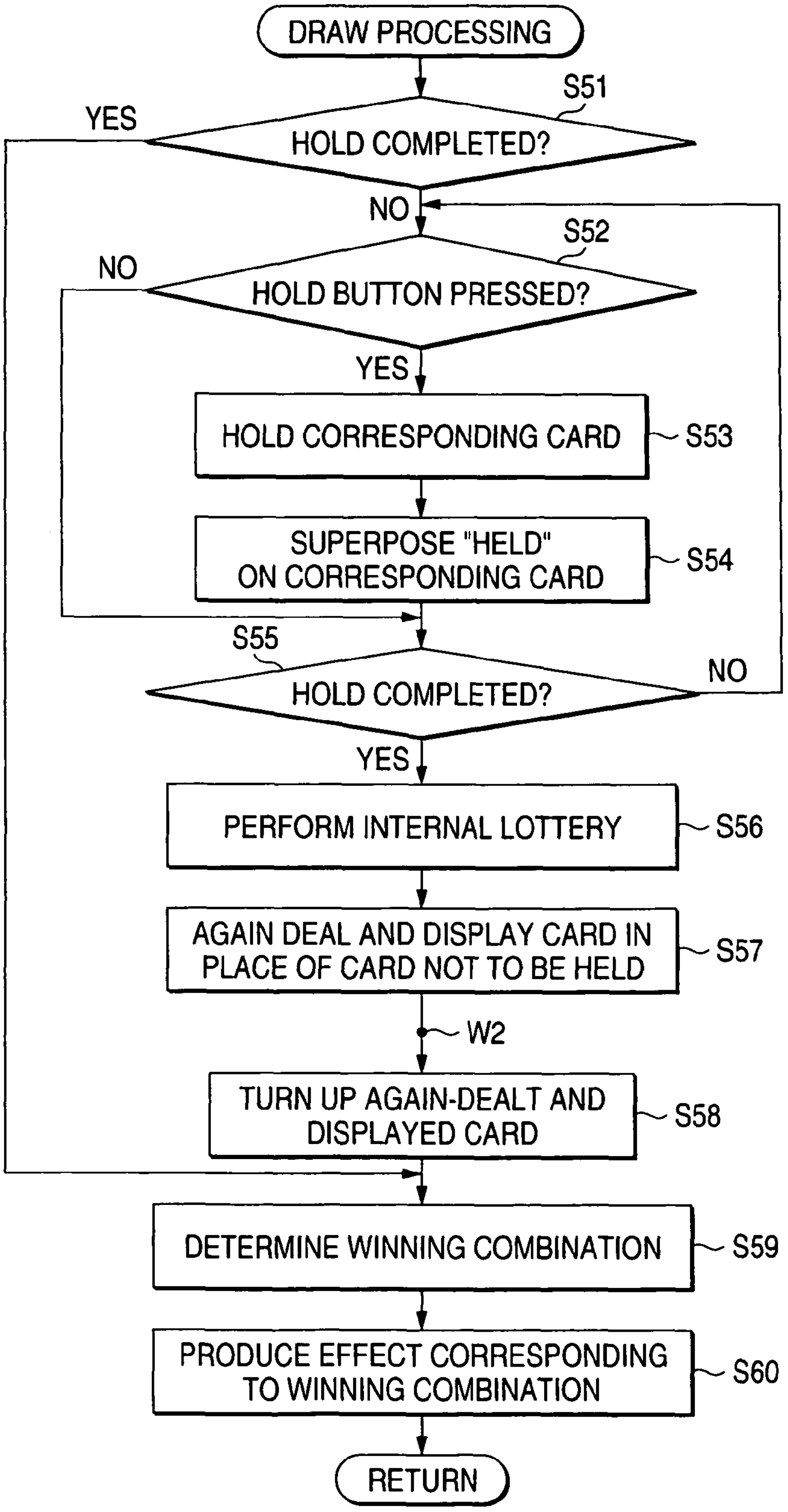
FIG. 27 is a flowchart to show the game control operation of the game control apparatus in the poker gaming machine according to the embodiment of the invention.

After this, the routine returns to the gaming machine processing in FIG. 24 and at S50, draw processing in FIG. 27 is performed.

Then, the draw processing in FIG. 27 will be discussed. First, at S51, whether or not the player completes the hold operation is determined. This determination is made by the fact that the CPU 3 receives a switch signal from the card exchange switch 17 based on pressing the card exchange button 40. At the same time, the CPU 3 transmits a display instruction to the image display drive circuit 23, which then displays the character string "HOLD AND DRAW" on the display screen 32 upon reception of the signal (see FIG. 10). If the CPU 3 does not receive a switch signal from the card exchange switch 17 although a given time has elapsed since the character string "HOLD AND DRAW" was displayed on the display screen 32, the CPU 3 determines that the hold operation is not completed (NO at S51), and goes to S52.

At S52, whether or not the player presses the hold button 41A, 41B, 41C, 41D, 41E, 41F is determined. This determination is made by the fact that the CPU 3 receives a switch signal from the hold switch 18A, 18B, 18C, 18D, 18E, 18F based on pressing the hold button 41A, 41B, 41C, 41D, 41E, 41F. At this time, if the CPU determines that the player presses the hold button 41A, 41B, 41C, 41D, 41E, 41F (YES at S52), the CPU 3 goes to S53.

At S53, the card corresponding to the hold button 41A, 41B, 41C, 41D, 41E, 41F determined pressed at S52 is held. Specifically, the CPU 3 determines the card to be held based on the switch signal from the hold switch 18A, 18B, 18C, 18D, 18E, 18F based on pressing the hold button 41A, 41B, 41C, 41D, 41E, 41F, stores the data concerning the deal position of the card in the RAM 5, and goes to S54.

At S54, the CPU 3 transmits a display instruction to the image display drive circuit 23, which then superposes the character string "HELD" on the held card on the display screen 32 upon reception of the signal (see FIG. 11). At this time, the held card is matched with that corresponding to the data concerning the deal position of the card stored in the RAM 5 at S53.

After this, the CPU goes to S55 and determines whether or not the player completes the hold operation. This determination is made by the fact that the CPU 3 receives a switch signal from the card exchange switch 17 based on pressing the card exchange button 40. At this time, if the CPU 3 determines that the player does not complete the hold operation (NO at S55), the CPU 3 returns to S52 and repeats the above-described processing. On the other hand, if the CPU 3 determines that the player completes the hold operation (YES at S55), the CPU 3 goes to S56.

At S56, internal lottery processing concerning the card to be drawn is performed. In this processing, the CPU 3 transmits a random number generation instruction to the random number control section 7, which then samples a random number upon reception of the signal. The random number provided by the random number control section 7 is stored in the RAM 5 as the random number indicating the lottery result. The CPU 3 references the lottery table stored in the ROM 4 and determines the type of card (to be drawn) corresponding to the random number. After storing the data concerning the card type in the RAM 5, the CPU 3 goes to S57.

Figure 12:
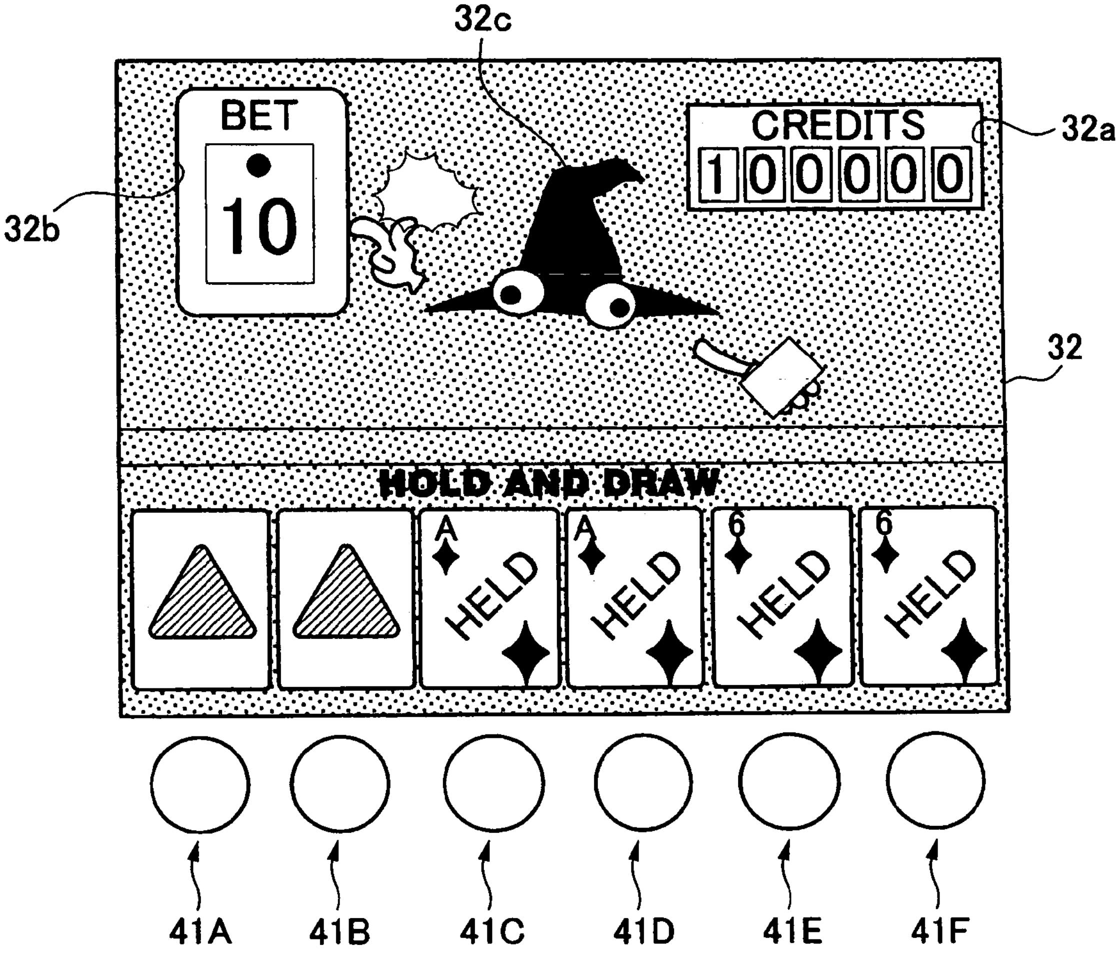
FIG. 12 is a drawing to show an example of the game contents displayed on the display screen when the poker game is developed in the poker gaming machine according to the embodiment of the invention.

At S57, the CPU 3 transmits a display instruction to the image display drive circuit 23, which then deals and displays the card (to be drawn) in a face-down state on the display screen 32 upon reception of the signal (see FIG. 12). At S58, the CPU 3 also transmits a display instruction to the image display drive circuit 23, which then turns up the card (to be drawn) on the display screen 32 upon reception of the signal (see FIG. 15). At the time, the symbol on the card (to be drawn) is matched with that corresponding to the data concerning the card type stored in the RAM 5 at S56.

After this, the CPU 5 goes to S59 and determines a winning combination. If the CPU 3 receives the switch signal from the card exchange switch 17 within a predetermined time after the character string "HOLD AND DRAW" was displayed on the display screen 32 at S51, the CPU 3 assumes that the player completes hold operation (YES at S51). At this time, the CPU 3 also goes to S59 and determines a winning combination. At S59, the CPU 3 determines which poker prize (poker card combination) containing a blank the combination of the symbols of the six cards displayed on the display screen 32 corresponds to, based on the data concerning the card types stored in the RAM 5 and the determination table stored in the ROM 4.

After this, the CPU 3 goes to S60 and transmits a display instruction to the image display drive circuit 23, which then produces the blessing effect of presenting a flower, etc., out of a hat by the dealer 32*c* (see FIG. 16) or superposes the character string "YOU LOSE . . . " on the six cards (see FIG. 17) on the display screen 32 upon reception of the signal. What the dealer 32*s* presents out of a hat in the blessing effect is determined in response to the poker prize of the winning combination, and superposing the character string "YOU LOSE . . . " on the six cards is limited to the case where the winning combination is a blank; the effect is selected based on the result at S59 and the table stored in the ROM 4.

Figure 28:
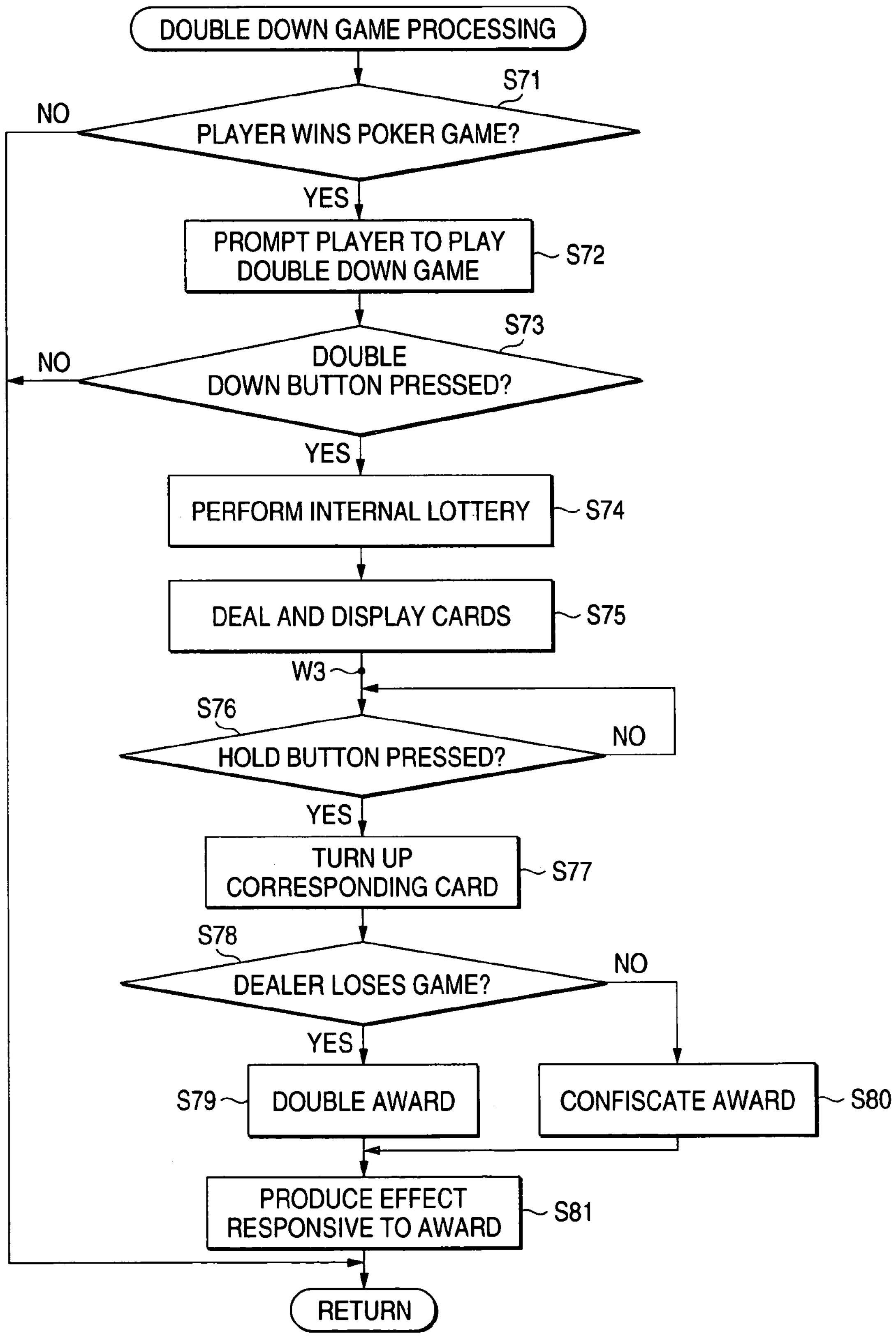
FIG. 28 is a flowchart to show the game control operation of the game control apparatus in the poker gaming machine according to the embodiment of the invention.

After this, the routine returns to the gaming machine processing in FIG. 24 and at S70, double down game processing in FIG. 28 is performed.

Then, the double down game processing in FIG. 28 will be discussed. First, at S71, whether or not the player wins the poker game is determined. To make this determination, the CPU 3 determines which poker prize (poker card combination) the combination of the symbols of the six cards displayed on the display screen 32 corresponds to, based on the data concerning the card types stored in the RAM 5 and the determination table stored in the ROM 4. At this time, if the CPU 3 determines that the player wins the poker game (YES at S71), the CPU 3 goes to S72.

At S72, the CPU 3 transmits a display instruction to the image display drive circuit 23, which then places the display screen 32 in a standby state of a double down game (see FIG. 18) upon reception of the signal, and prompts the player to play a double down game.

After this, the CPU 3 goes to S73 and determines whether or not the player presses the double down button 39 within the predetermined time after the display screen 32 was placed in the standby state of a double down game. This determination is made by the fact that the CPU 3 receives a switch signal from the double down switch 16 based on pressing the double down button 39. At this time, if the CPU 3 determines that the player presses the double down button 39 within the predetermined time after the display screen 32 was placed in the standby state of a double down game (YES at S73), the CPU 3 goes to S74.

At S74, internal lottery processing concerning the cards to be dealt is performed. In this processing, the CPU 3 transmits a random number generation instruction to the random number control section 7, which then samples a random number upon reception of the signal. The random number provided by the random number control section 7 is stored in the RAM 5 as the random number indicating the lottery result. The CPU 3 references the lottery table stored in the ROM 4 and determines the types of cards (one to be dealt to the dealer and five to be dealt to the player) corresponding to the random number. After storing the data concerning the card types in the RAM 5, the CPU 3 goes to S75.

Figure 20:
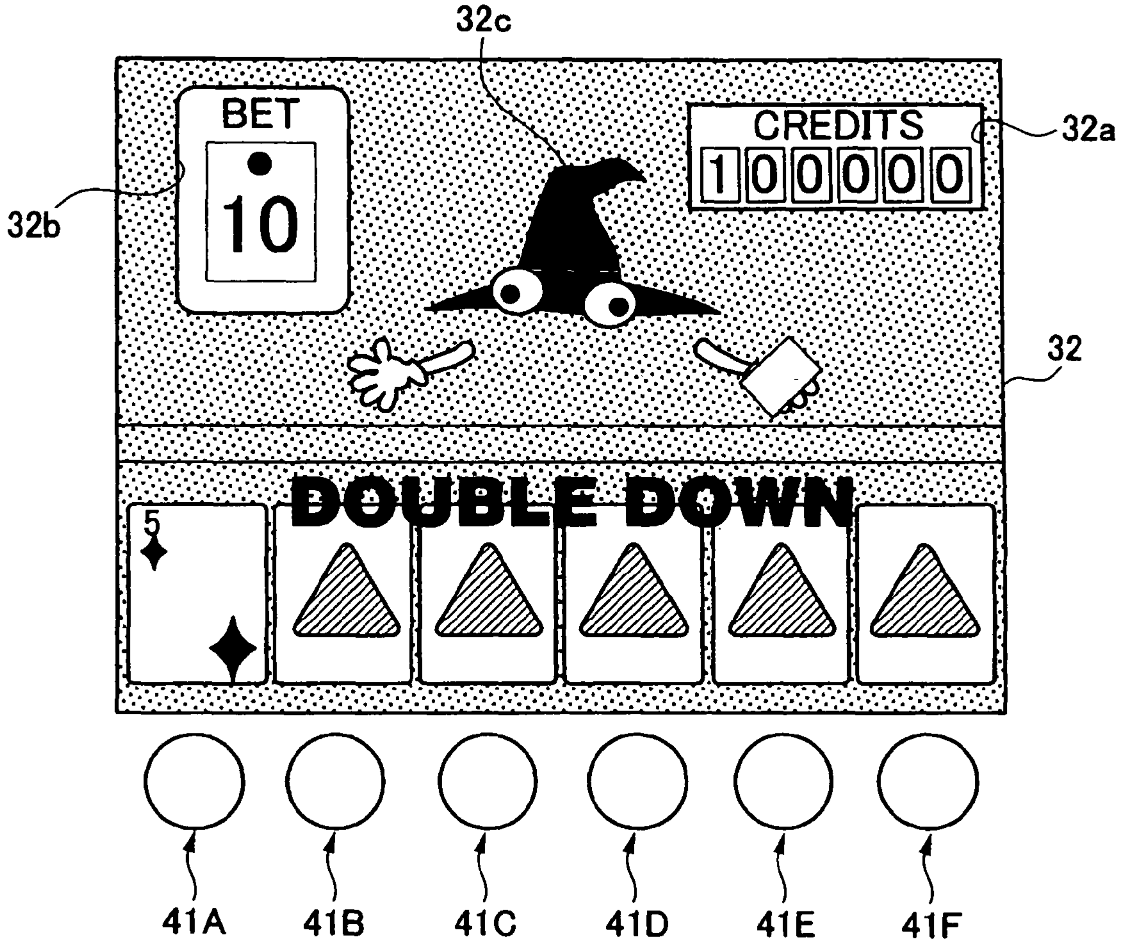
FIG. 20 is a drawing to show an example of the game contents displayed on the display screen when the double down game is developed in the poker gaming machine according to the embodiment of the invention.

At S75, the CPU 3 transmits a display instruction to the image display drive circuit 23, which then deals and displays one card to the dealer in a face-up state and five cards to the player in a face-down state on the display screen 32 upon reception of the signal (see FIG. 20). At this time, the symbol of the card dealt to the dealer is matched with that corresponding to the data concerning the card type stored in the RAM 5 at S74.

After this, the CPU 3 goes to S76 and determines whether or not the player presses the hold button 41B, 41C, 41D, 41E, 41F. This determination is made by the fact that the CPU 3 receives a switch signal from the hold switch 18B, 18C, 18D, 18E, 18F based on pressing the hold button 41B, 41C, 41D, 41E, 41F. At this time, if the CPU determines that the player does not press the hold button 41B, 41C, 41D, 41E, 41F (NO at S76), the CPU 3 returns to S76 and repeats this step. On the other hand, if the CPU determines that the player presses the hold button 41B, 41C, 41D, 41E, 41F (YES at S76), the CPU 3 selects the card corresponding to the hold button 41B, 41C, 41D, 41E, 41F determined pressed at S76. Specifically, the CPU 3 determines the card to be selected based on the switch signal from the hold switch 18B, 18C, 18D, 18E, 18F based on pressing the hold button 41B, 41C, 41D, 41E, 41F, stores the data concerning the deal position of the card in the RAM 5, and goes to S77.

At S77, the CPU 3 transmits a display instruction to the image display drive circuit 23, which then turns up the selected card on the display screen 32 upon reception of the signal. At this time, the symbol on the selected and turned-up card is matched with that corresponding to the data concerning the card type stored in the RAM 5 at S74.

After this, the CPU goes to S78 and makes a comparison between the numeral of the card dealt to the dealer and the numeral of the selected card based on the card type and the deal position stored in the RAM 5 at S74 and S76 for determining whether or not the dealer loses the game. At this time, if the CPU 3 determines that the dealer loses the game, namely, the numeral of the selected card is greater than the numeral of the card dealt to the dealer (YES at S78), the CPU 3 doubles the award at S79 and goes to S81. On the other hand, if the CPU 3 determines that the dealer wins the game, namely, the numeral of the selected card is equal to or less than the numeral of the card dealt to the dealer (NO at S78), the CPU3 confiscates the award at S80 and goes to S81.

At S81, the CPU 3 transmits a display instruction to the image display drive circuit 23, which then produces the blessing effect of presenting a flower, etc., out of a hat by the dealer 32*c* or superposes the character string "YOU LOSE . . . " on the six cards (see FIG. 17) on the display screen 32 upon reception of the signal. The blessing effect of presenting a flower, etc., out of a hat by the dealer 32*c* is limited to the case where the award is doubled. Superposing the character string "YOU LOSE . . . " on the six cards is limited to the case where the award is confiscated.

After this, the routine returns to the gaming machine processing in FIG. 24 and the process goes to S90. If it is determined that the player does not win the poker game (NO at S71), the player does not have a right to try a double down game and therefore S72 to S80 are skipped and the routine returns to the gaming machine processing in FIG. 24 and the process goes to S90. Further, it is determined at S73 that the player does not press the double down button 39 within the predetermined time after the display screen 32 was placed in the standby state of a double down game (NO at S73), it is assumed that the player does not intend to try a double down game. Then, S74 to S80 are skipped and the routine returns to the gaming machine processing in FIG. 24 and the process goes to S90.

When the routine returns to the gaming machine processing in FIG. 24 and S90 is executed, the award is paid out. Specifically, as many game medals, etc., as the acquired number of game medals, etc., at the point in time are paid out from the hopper 24 or the value of the acquired number of game medals, etc., is added to the value of the medal storage section 25 as credit. The current poker game or the current double down game is now complete.

Further, in the poker gaming machine 1 of the embodiment, the effect to make the player swell with the sense of anticipation that a poker prize may come into effect may be produced just after six cards are dealt on the display screen 32 as described above. To produce this effect, deal display processing in FIG. 1 is performed at W1 between S32 and S33 in the deal processing in FIG. 26.

That is, in the deal display processing in FIG. 1, first at S101, the CPU 3 acquires the counter value from the circular arc counter provided in the RAM 5 and goes to S102. At S102, the CPU 3 determines a winning combination. The CPU 3 determines which poker prize (poker card combination) containing a blank the combination of the symbols of the six cards displayed on the display screen 32 corresponds to, based on the data concerning the card types stored in the RAM 5 and the determination table stored in the ROM 4. At this time, if the combination corresponds to any poker prize, the number provided for the poker prize is stored in the RAM 5 based on the table of FIG. 23; if the combination corresponds to a blank, the fact is stored in the RAM 5.

The CPU 3 goes to S103 and transmits a display instruction to the image display drive circuit 23, which then produces deal effect display on the display screen 32 (see FIG. 7) upon reception of the signal. The deal effect display is produced based on the dealing effect table of FIG. 31 through the counter value acquired at S101, the number stored in the RAM 5 at S102, etc. Accordingly, when the six cards are dealt, if a poker prize comes into effect, the effect of flashing the six cards, the effect of displaying the mark "!," "!!," "*," "," in the balloon 32***d* of the dealer 32*c*, the premium effect, etc., is produced at a high probability. Thus, if the player recognizes the effect, the player swells with the sense of anticipation that a poker prize may come into effect.

In the poker gaming machine 1 of the embodiment, the effect to make the player swell with the sense of anticipation that a poker prize may come into effect with the combination of the drawn and held cards may be produced just after the card is drawn on the display screen 32 as described above. To produce this effect, draw display processing in FIG. 29 is performed at W2 between S57 and S58 in the draw processing in FIG. 27.

Figure 29:
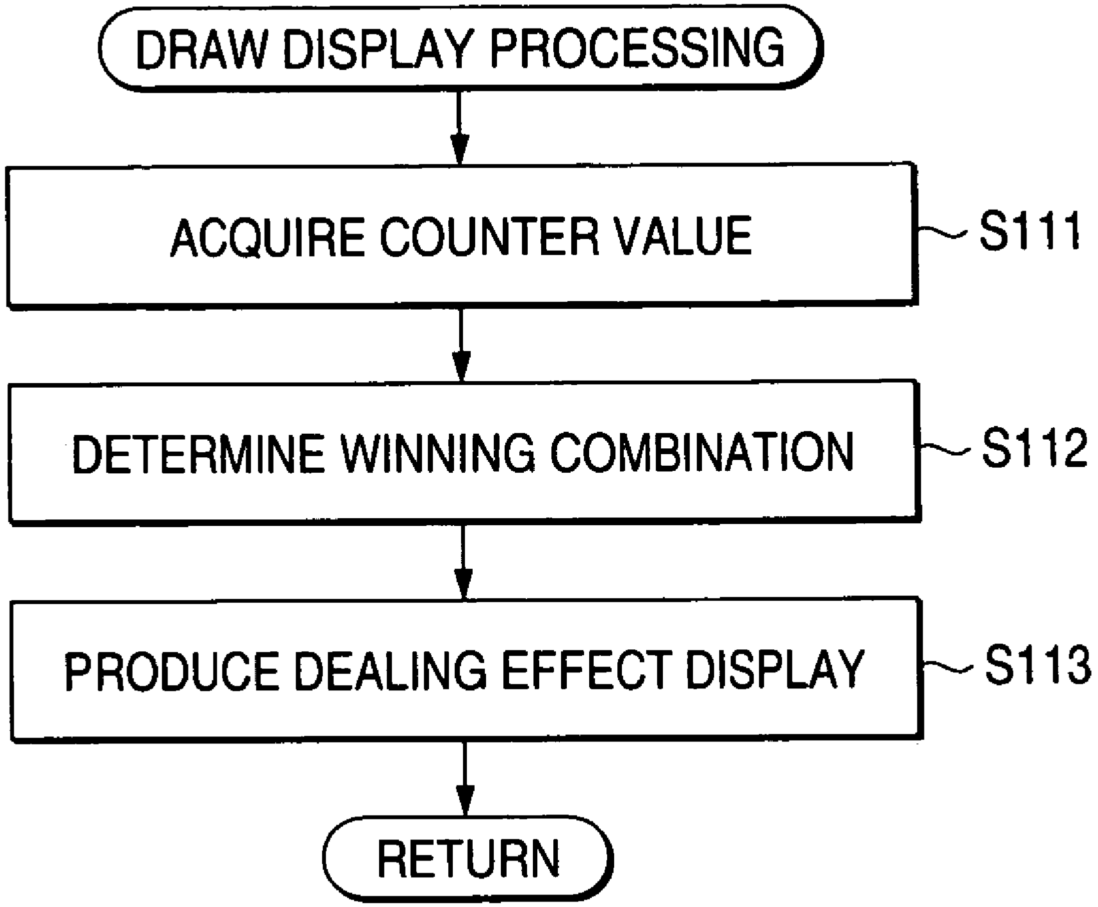
FIG. 29 is a flowchart to show the game control operation of the game control apparatus in the poker gaming machine according to the embodiment of the invention.

That is, in the draw display processing in FIG. 29, first at S111, the CPU 3 acquires the counter value from the circular arc counter provided in the RAM 5 and goes to S112. At S112, the CPU 3 determines a winning combination. The CPU 3 determines which poker prize (poker card combination) containing a blank the combination of the symbols of the six cards (drawn and held cards) displayed on the display screen 32 corresponds to, based on the data concerning the card types stored in the RAM 5 and the determination table stored in the ROM 4. At this time, if the combination corresponds to any poker prize, the number provided for the poker prize is stored in the RAM 5 based on the table of FIG. 23; if the combination corresponds to a blank, the fact is stored in the RAM 5.

The CPU 3 goes to S113 and transmits a display instruction to the image display drive circuit 23, which then produces deal effect display on the display screen 32 (see FIGS. 13 and 14) upon reception of the signal. The deal effect display is produced based on the draw deal effect table of FIG. 32 through the counter value acquired at S111, the number stored in the RAM 5 at S112, etc. Accordingly, when the card is drawn, if a poker prize comes into effect with the combination of the drawn and held cards, the effect of flashing the drawn and held cards, the effect of covering the drawn card with a smoke screen, flame, thunder, the premium effect, etc., is produced at a high probability. Thus, if the player recognizes the effect, the player swells with the sense of anticipation that a poker prize may come into effect.

Further, in the poker gaming machine 1 of the embodiment, when a double down game is played on the display screen 32, the effect to make the player swell with the sense of anticipation that the five cards dealt to the player as the face-down cards may contain a card greater than the card of the dealer in the face-up state may be produced just after one card is dealt to the dealer and is displayed in the face-up state and five cards are dealt to the player and are displayed in the face-down state on the display screen 32 as described above. To produce this effect, double down game display processing in FIG. 30 is performed at W3 between S75 and S76 in the double down game processing in FIG. 28.

Figure 30:
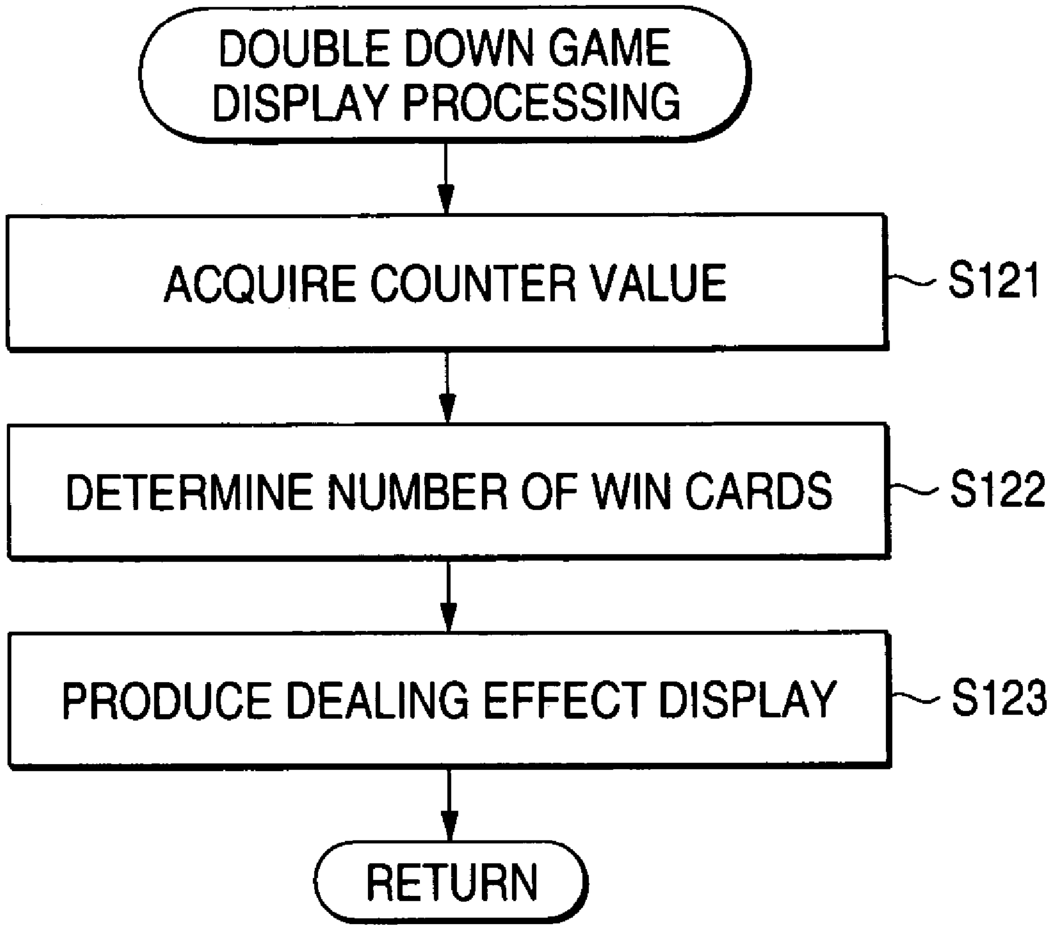
FIG. 30 is a flowchart to show the game control operation of the game control apparatus in the poker gaming machine according to the embodiment of the invention.

That is, in the double down game display processing in FIG. 30, first at S121, the CPU 3 acquires the counter value from the circular arc counter provided in the RAM 5 and goes to S122. At S122, the CPU 3 determines the number of win cards of the player. To make this determination, the CPU 3 determines whether or not each of the five cards of the player is greater than the card of the dealer displayed on the display screen 32 based on the data concerning the card types and the card deal positions stored in the RAM 5, counts the number of win cards of the player, and stores the count in the RAM 5.

The CPU 3 goes to S123 and transmits a display instruction to the image display drive circuit 23, which then produces deal effect display on the display screen 32 (see FIG. 21) upon reception of the signal. The deal effect display is produced based on the double down game deal effect table of FIG. 33 through the counter value acquired at S121, the number of win cards stored in the RAM 5 at S122, etc. Accordingly, if the number of win cards of the player is one or more, the effect of flashing the five cards dealt to the player as face-down cards, the effect of making the dealer 32*c* get giddy, go faint etc., is produced. Thus, if the player recognizes the effect, the player swells with the sense of anticipation that the five cards dealt to the player as the face-down cards may contain a card greater than the card of the dealer in the face-up state.

The invention is not limited to the specific embodiment described above and various modifications can be made without departing from the spirit and the scope of the invention.

For example, in the poker gaming machine 1 of the embodiment, when cards are dealt on the display screen 32 where a poker game is in progress, if the six cards of the player complete a poker prize, the effect is produced for the dealt cards and the dealer 32*c* dealing the cards (see FIGS. 7 and 8) at a predetermined probability (see FIGS. 23 and 31), whereby the player is provided with the sense of anticipation that the six cards of the player may complete a poker prize. For example, when cards are dealt, if the six cards of the player do not complete a poker prize, when a poker prize comes into effect with one card, etc., the effect is produced for the dealt cards and the dealer 32*c* dealing the cards at a predetermined probability, whereby the player may be provided with the sense of anticipation that the six cards of the player may easily complete a poker prize.

In the poker gaming machine 1 of the embodiment, when cards are dealt on the display screen 32 where a poker game or a double down game is in progress, if a poker prize comes into effect or the win card of the player exists, the effect is produced for the dealt cards and the dealer 32*c* dealing the cards (see FIGS. 7, 8, 13, 14, and 21) at a predetermined probability (see FIGS. 23, 31, 32, and 33). In any other type of card game, such as a black jack game, a baccarat or Japanese playing cards, when cards are dealt, for example, if the cards of the player have the advantage over those of the opponent or complete a predetermined prize, the effect is produced for the dealt cards and the dealer dealing the cards at a predetermined probability, whereby the player may be provided with the sense of anticipation that the cards of the player may have the advantage over those of the opponent or may complete a predetermined prize.

The invention can be applied to the effect at the card dealing time in a card game.

What is claimed is:

1. A card gaming machine comprising:

an extraction unit configured to extract a plurality of cards from a deck of playing cards having predetermined symbols drawn thereon;

a display unit configured to display an image of said plurality of cards being extracted by the extraction unit and dealt to a player hand as a group of cards in said player hand;

a control unit configured to produce an image effect on the display unit in response to a deal situation determined by the predetermined symbols drawn on the group of cards in said player hand, said deal situation being displayed as an image by the display unit, said image effect comprising a dealer character displayed at a center of said display unit throughout an operation of said card gaming machine, said dealer character providing animated responses on said display unit in response to said deal situation;

a storage unit storing a plurality of tables, said plurality of tables providing a relationship between said deal situation and said image effect, said control unit using said relationship to determine said image effect to be produced on said display unit in response to a determination of said deal situation, said plurality of tables comprising:

a dealing effect table configured to provide said relationship in a poker game, said dealing effect table being referenced by said control unit to determine said image effect to be produced in response to said deal situation after said plurality of cards is dealt to said player hand as said group of cards in said player hand;

a draw deal effect table configured to provide said relationship in said poker game, said draw deal effect table being referenced by said control unit to determine said image effect to be produced in response to said deal situation after at least one of said group of cards in said player hand is exchanged for at least one card from said deck of playing cards; and a double down game deal effect table configured to provide said relationship in a double down game, said double down game deal effect table being referenced by said control unit to determine said image effect to be produced in response to said deal situation after a card from said deck of playing cards is displayed in a face-up state on said display unit and another plurality of cards from said deck of playing cards is dealt to said player hand in a face-down state as another group of cards in said player hand; and a lottery unit for sampling a random number, wherein the control unit produces the image effect based on said random number sampled by the lottery unit, wherein, if the deal situation comprises a winning poker hand, the control unit offers said double down game to be played, wherein, if the offer of the control unit to play said double down game is accepted, the control unit enables said double down game to be played, wherein an excitement level of said image effect is dependent upon a quality of said deal situation, and wherein said relationship between said image effect and said deal situation defines said excitement level of said image effect, wherein each of said dealing effect table, said draw deal effect table, and said double down game deal effect table includes a relationship between a winning combination, a dealing effect description, and a probability that at least one premium effect is produced; and wherein the at least one premium effect is one of a plurality of premium effects and is chosen based on a probability associated with the winning combination.

2. The card gaming machine according to claim 1, wherein said control unit produces a sound effect through a speaker in response to said deal situation displayed as said image by the display unit.

3. The card gaming machine according to claim 1, wherein said dealer character deals said plurality of cards to said player hand as a group of cards in said player hand.

4. The card gaming machine according to claim 1, wherein said control unit produces said animated responses of said dealer character in response to the relationship between the deal situation and the image effect.

5. The card gaming machine according to claim 1, wherein said image effect determined by said control unit through said relationship provided in said dealing effect table is produced after said plurality of cards is dealt to said player hand as said group of cards in said player hand.

6. The card gaming machine according to claim 1, wherein said image effect determined by said control unit through said relationship provided in said draw deal effect table is produced after said at least one of said group of cards in said player hand is exchanged for said at least one card from said deck of playing cards.

7. The card gaming machine according to claim 1, wherein said image effect determined by said control unit through said relationship provided in said double down game deal effect table is produced after said card from said deck of playing cards is displayed in said face-up state on said display unit and said another plurality of cards from said deck of playing cards is dealt to said player hand in said face-down state as said another group of cards in said player hand.

8. The card gaming machine according to claim 1, wherein a production of said image effect occurs after said deal situation is displayed.

9. A card gaming machine, comprising:

a deck of playing cards;

a lottery unit configured to sample at least one of a plurality of random numbers respectively corresponding to said playing cards to determine at least one of said playing cards to be dealt to a player hand or exchanged to said player hand for at least one of a plurality of playing cards previously dealt to said player hand;

a display unit configured to display said playing cards being dealt to said player hand and exchanged to said player hand for at least one of said plurality of playing cards previously dealt to said player hand;

a storage unit storing a plurality of tables, said plurality of tables providing a relationship between a combination of said playing cards in said player hand and an image effect configured to be displayed on said display unit, said relationship being used to determine said image effect to be produced on said display unit in response to said combination of said playing cards in said player hand, said plurality of tables comprising:

a dealing effect table configured to provide said relationship in a poker game, said dealing effect table being referenced to determine an image effect to be produced in response to a combination of said playing cards in said player hand after at least one of said playing cards is dealt to said player hand;

a draw deal effect table configured to provide said relationship in said poker game, said draw deal effect table being referenced to determine an image effect to be produced in response to a combination of said playing cards in said player hand after at least one of said playing cards is exchanged to said player hand for at least one of said plurality of playing cards previously dealt to said player hand; and a double down game deal effect table configured to provide said relationship in a double down game, said double down game deal effect table being referenced to determine an image effect to be produced in response to a combination of said playing cards in said player hand after one of said playing cards is displayed in a face-up state on said display unit and at least one of said playing cards is dealt to said player hand in a face-down state on said display unit; and a control unit configured to offer said double down game to be played if said player hand in said poker game is a winning hand, to enable said double down game to be played if said offer is accepted, and to use said relationship and reference said plurality of tables to determine said image effect to be produced on the display unit in response to said combination of said playing cards in said player hand, said image effect comprising a dealer character displayed at a center of said display unit throughout said poker game and said double down game, said dealer character providing animated responses on said display unit in response to said combination of said playing cards in said player hand, wherein an excitement level of said image effect is dependent upon a quality of said combination of said playing cards in said player hand, wherein said relationship between said image effect and said combination of said playing cards in said player hand defines said excitement level of said image effect, and wherein each of said dealing effect table, said draw deal effect table, and said double down game deal effect table includes a relationship between a winning combination, a dealing effect description, and a probability that at least one premium effect is produced; and wherein the at least one premium effect is one of a plurality of premium effects and is chosen based on a probability associated with the winning combination.

10. The card gaming machine according to claim 9, wherein said control unit produces a sound effect through a speaker to correspond with a display of said image effect.

11. The card gaming machine according to claim 9, wherein said dealer character deals said playing cards to said player hand.

12. The card gaming machine according to claim 9, wherein said image effect comprises one of a plurality of image effects, wherein said plurality of tables provides said relationship between said combination of said playing cards and said plurality of image effects and associates a plurality of counter values to said plurality of image effects, and wherein said control unit selects said image effect from said plurality of image effects according to a random number that matches one of said plurality of counter values.

* * * * *